(12) United States Patent
Alsarhan et al.

(10) Patent No.: US 11,676,502 B2
(45) Date of Patent: Jun. 13, 2023

(54) DATA ANALYSIS PROCEDURE FOR IN-CLASS ENGAGEMENT DATASET

(71) Applicant: Utah Valley University, Orem, UT (US)

(72) Inventors: Ala'a Alsarhan, Orem, UT (US); Rasha Qudisat, Orem, UT (US)

(73) Assignee: Utah Valley University, Orem, UT (US)

( * ) Notice: Subject to any disclaimer, the term of this patent is extended or adjusted under 35 U.S.C. 154(b) by 928 days.

(21) Appl. No.: 16/558,963

(22) Filed: Sep. 3, 2019

(65) Prior Publication Data

US 2020/0074873 A1    Mar. 5, 2020

Related U.S. Application Data

(60) Provisional application No. 62/725,979, filed on Aug. 31, 2018.

(51) Int. Cl.
G09B 7/02    (2006.01)

(52) U.S. Cl.
CPC ..................... G09B 7/02 (2013.01)

(58) Field of Classification Search
CPC ....................................................... G09B 7/02
See application file for complete search history.

(56) References Cited

U.S. PATENT DOCUMENTS

2013/0034840 A1* 2/2013 Burton ............... G06Q 30/0201
434/362
2017/0286532 A1* 10/2017 Horowitz ............ G06F 16/2423

OTHER PUBLICATIONS

Williamson, M. & Gaston, K., A simple transformation for sets of range sizes, (1999), Ecography, 22(6), 674-680 (Year: 1999).*

(Continued)

*Primary Examiner* — Jay Trent Liddle
*Assistant Examiner* — Alyssa N Brandley
(74) *Attorney, Agent, or Firm* — Kunzler Bean & Adamson; Bruce R. Needham

(57) ABSTRACT

A method for academic engagement includes parsing answers from questions in a question group from completed questionnaires. Answers are discrete numbers. The method includes determining a transformed scale score as: $\acute{x}=x-1$, determining a POMP score as:

$$p = \frac{\acute{x}}{n}$$

and mapping a rescaled probability as: $\acute{p}=\delta p+0.5(1-\delta)$. $\delta$ is a scaling constant between 0.5 and 1. The method includes determining a modified logit as:

$$t = \ln\left(\frac{\acute{p}}{1-\acute{p}}\right),$$

determining a mean for the modified logit values and determining a mean rescaled probability for each determined mean as:

$$\acute{p} = \frac{e^{t}}{1+e^{t}}.$$

The method includes determining an estimated standard probability as:

(Continued)

$$\hat{p} = \frac{\hat{p}' + 0.5(\delta-1)}{\delta},$$

determining a rescaled transformed scale score as: $\hat{x}=4\hat{p}$ and transforming the rescaled transformed scale score to an estimated score: $\hat{X}=\hat{x}+1$. The method includes reporting the estimated score $\hat{X}$ for each question group of the questionnaire group.

25 Claims, 10 Drawing Sheets

(56) References Cited

OTHER PUBLICATIONS

Hu, C., Yielding, N., Davis, H.M., Zhou, H., Bounded outcome score modeling: Application to treating psoriasis with ustekinumab, (2011), Journal of Pharmacokinetics and Pharmacodynamics, 38 (4), 497-517 (Year: 2011).*
Lang, J.W., & Kersting, M., Regular feedback from student ratings of instruction. Do college teachers improve their ratings in the long run?, (2007), Instructional Science, 35(3), 187-205 (Year: 2007).*
Ala'a Mohammad Alsarhan, "Alternative Methods of Estimating the Degree of Uncertainty in Student Ratings of Teaching", Brigham Young University, BYU ScholarsArchive, (2017), pp. 1-157.

\* cited by examiner

Factors of Engaged Learning

DATA ANALYSIS PROCEDURE FOR IN-CLASS ENGAGEMENT DATASET

CROSS-REFERENCES TO RELATED APPLICATIONS

This application claims the benefit of U.S. Provisional Patent Application No. 62/725,979 entitled "DATA ANALYSIS PROCEDURE FOR THE IN-CLASS ENGAGEMENT DATASET" and filed on Aug. 31, 2018 for Ala'a Alsarhan, et al., which is incorporated herein by reference.

FIELD

This invention relates to classroom engagement and more particularly relates to a data analysis procedure for in-class engagement dataset.

BACKGROUND

Determining effectiveness of an educational course is difficult due to the number of variables, differing questions, which may not be effective, students not completing surveys and other factors. Also, determining effectiveness of various courses are specific to the course and therefore it is difficult to access course effectiveness compared to other courses in other departments, universities, etc.

SUMMARY

An apparatus for academic engagement includes a data parsing module that parses answers x from a plurality of questions from a plurality of completed questionnaires. The answers are from one or more questions forming a question group and the plurality of questionnaires form a questionnaire group. Answers for each question are discrete numbers from 1 to n. The apparatus includes a range transform module that determines a transformed scale score for each answer x to questions in the questionnaire for the questionnaire group as: $\acute{x}=x-1$, a proportion of maximum possible ("POMP") module that determines a POMP score p for each answer as:

$$p = \frac{\acute{x}}{n}$$

and a rescaled probability module that maps a rescaled probability $\acute{p}$ for each answer as: $\acute{p}=\delta p+0.5(1-\delta)$, where $\delta$ is a scaling constant greater than 0.5 and less than 1 and p is the POMP score.

The apparatus includes a modified logit module that determines a modified logit t of the rescaled probability $\acute{p}$ for each answer as:

$$t = \ln\left(\frac{\acute{p}}{1-\acute{p}}\right)$$

and a statistics module that determines a mean for the modified logit values $\bar{t}$ for each question group for the questionnaire group from the modified logit t values. The apparatus includes a mean rescaled probability module that determines a mean rescaled probability $\hat{p}x$ for each determined mean for modified logit values $\bar{t}$ as:

$$\hat{p} = \frac{e^{\bar{t}}}{1+e^{\bar{t}}}$$

and an estimated standard probability module that determines an estimated standard probability $\hat{p}$ for the mean rescaled probability $\hat{p}$ as:

$$\hat{p} = \frac{\hat{p} + 0.5(\delta - 1)}{\delta}.$$

The apparatus includes a rescaled value module that determines a rescaled transformed scale score $\hat{x}$ for the estimated standard probability $\hat{p}$ as: $\hat{x}=4\hat{p}$, a range retransformation module that transforms the rescaled transformed scale score $\hat{x}$ to an estimated score $\hat{X}$ for each rescaled transformed scale score $\hat{x}$ as: $\hat{X}=\hat{x}+1$ and a reporting module that reports the estimated score $\hat{X}$ for each question group of the questionnaire group. At least a portion of the modules include hardware circuits, programmable hardware circuits and/or executable code, where the executable code is stored on one or more computer readable storage media.

Another apparatus for academic engagement includes a data parsing module that parses answers x from a plurality of questions from a plurality of completed questionnaires. The plurality of questionnaires form a questionnaire group. Answers for each question include discrete numbers from 1 to n and the questions from the no questionnaire includes questions for assessing engagement of students taking an educational course. The questions are grouped into questions from a same category and the categories include content, context, tools, collaboration, theory and knowledge, and application and skills in a curriculum engagement group, and community involvement and expert interaction in a community engagement group. The apparatus includes a range transform module that determines a transformed scale score $\acute{x}$ for each answer to questions in the questionnaire for the questionnaire group as: $\acute{x}=x-1$ and a proportion of maximum possible ("POMP") module that determines a POMP score p for each answer as:

$$p = \frac{\acute{x}}{n}.$$

The apparatus includes a rescaled probability module that maps a rescaled probability $\acute{p}$ for each answer as: $\acute{p}=\delta p+0.5(1-\delta)$, where $\delta$ is a scaling constant greater than 0.5 and less than 1 and p is the POMP score. The apparatus includes a modified logit module that determines a modified logit t of the rescaled probability $\acute{p}$ for each answer as:

$$t = \ln\left(\frac{\acute{p}}{1-\acute{p}}\right)$$

and a statistics module that determines a mean for the modified logit values $\bar{t}$ for each category of questions from the calculated t values. The apparatus includes a mean rescaled probability module that determines a mean rescaled probability $\hat{p}$ for each modified logit value $\bar{t}$ as:

$$\hat{p} = \frac{e^{\bar{t}}}{1+e^{\bar{t}}}$$

and an estimated standard probability module that determines an estimated standard probability $\hat{p}$ for each mean rescaled probability $\bar{p}$ as:

$$\hat{p} = \frac{\bar{p}+0.5(\delta-1)}{\delta}.$$

The apparatus includes a rescaled value module that determines a rescaled transformed scale score $\hat{x}$ for each estimated standard probability $\hat{p}$ as: $\hat{x}=4\hat{p}$ and a range retransformation module that transforms the rescaled transformed scale score $\hat{x}$ to an estimated score $\hat{X}$ for each rescaled transformed scale score $\hat{x}$ as: $\hat{X}=\hat{x}+1$.

The apparatus includes a category summation module that averages the estimated $\hat{X}$ for the curriculum engagement group into a curriculum engagement average score and that averages the estimated $\hat{X}$ for the community engagement group into a community engagement average score. The apparatus includes a reporting module that reports the curriculum engagement average score for the questionnaire group and reports the community engagement average score for the questionnaire group. At least a portion of the modules include hardware circuits, programmable hardware circuits and/or executable code, where the executable code is stored on one or more computer readable storage media.

A method for academic engagement includes parsing answers x from a plurality of questions from a plurality of completed questionnaires. The answers are from one or more questions forming a question group and the plurality of questionnaires form a questionnaire group. Answers for each question are discrete numbers from 1 to n. The method includes determining a transformed scale score for each answer to questions in the questionnaire for the questionnaire group as: $\acute{x}=x-1$, determining a proportion of maximum possible ("POMP") score p for each answer as:

$$p = \frac{\acute{x}}{n}$$

and mapping a rescaled probability $\acute{p}$ for each answer as: $\acute{p}=\delta p+0.5(1-\delta)$, where $\delta$ is a scaling constant greater than 0.5 and less than 1 and p is the POMP score. The method includes determining a modified logit t of the rescaled probability $\acute{p}$ for each answer as:

$$t = \ln\left(\frac{\acute{p}}{1-\acute{p}}\right),$$

determining a mean for the modified logit values $\bar{t}$ for each question group for the questionnaire group from the modified logit t values and determining a mean rescaled probability $\bar{p}$ for each determined mean for modified logit values $\bar{t}$ as:

$$\bar{p} = \frac{e^{\bar{t}}}{1+e^{\bar{t}}}.$$

The method includes determining an estimated standard probability $\hat{p}$ for the mean rescaled probability $\bar{p}$ as:

$$\hat{p} = \frac{\bar{p}+0.5(\delta-1)}{\delta},$$

determining a rescaled transformed scale score $\hat{x}$ for the estimated standard probability $\hat{p}$ as: $\hat{x}=4\hat{p}$ and transforming the rescaled transformed scale score to an estimated $\hat{X}$ for each rescaled transformed scale score $\hat{x}$ as: $\hat{X}=\hat{x}+1$. The method includes reporting the estimated $\hat{X}$ for each question group of the questionnaire group.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
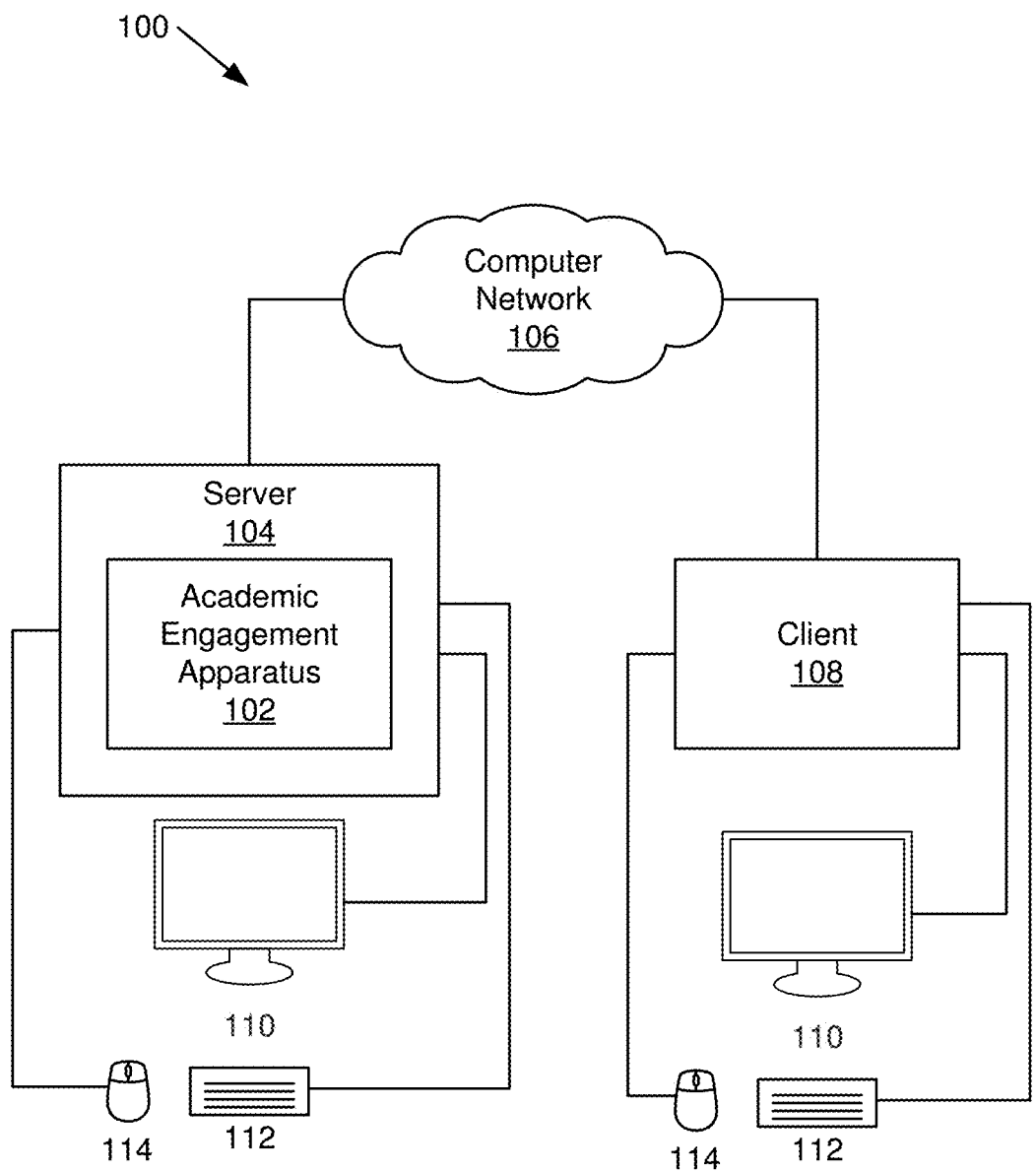
FIG. 1 is a schematic block diagram illustrating one embodiment of a system for academic engagement.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

An apparatus for academic engagement includes a data parsing module that parses answers x from a plurality of questions from a plurality of completed questionnaires. The answers are from one or more questions forming a question group and the plurality of questionnaires form a questionnaire group. Answers for each question are discrete numbers from 1 to n. The apparatus includes a range transform module that determines a transformed scale score for each answer x to questions in the questionnaire for the questionnaire group as: $\acute{x}=x-1$, a proportion of maximum possible ("POMP") module that determines a POMP score p for each answer as:

$$p = \frac{\acute{x}}{n}$$

and a rescaled probability module that maps a rescaled probability ṕ for each answer as: ṕ=δp+0.5 (1−δ), where δ is a scaling constant greater than 0.5 and less than 1 and p is the POMP score.

The apparatus includes a modified logit module that determines a modified logit t of the rescaled probability ṕ for each answer as:

$$t = \ln\left(\frac{\acute{p}}{1-\acute{p}}\right)$$

and a statistics module that determines a mean for the modified logit values t́ for each question group for the questionnaire group from the modified logit t values. The apparatus includes a mean rescaled probability module that determines a mean rescaled probability p̀ for each determined mean for modified logit values t́ as:

$$\grave{p}\frac{e^{\acute{t}}}{1+e^{\acute{t}}}$$

and an estimated standard probability module that determines an estimated standard probability p̂ for the mean rescaled probability p̀ as:

$$\hat{p} = \frac{\grave{p} + 0.5(\delta - 1)}{\delta}.$$

The apparatus includes a rescaled value module that determines a rescaled transformed scale score x̂ for the estimated standard probability p̂ as: x̂=4p̂, a range retransformation module that transforms the rescaled transformed scale score x̂ to an estimated X̂ for each rescaled transformed scale score x̂ as: X̂=x̂+1 and a reporting module that reports the estimated X̂ for each question group of the questionnaire group. At least a portion of the modules include hardware circuits, programmable hardware circuits and/or executable code, where the executable code is stored on one or more computer readable storage media.

In some embodiments, the question group includes a group of questions from a same category of questions and the reporting module reports the estimated score X̂ of the category of questions. In other embodiments, the questionnaire includes m categories of questions and the apparatus includes a category summation module that averages the estimated X̂ of at least a portion of the m categories into an average score and reports the average score of the at least a portion of the m categories. In other embodiments, the questions from the questionnaire include questions for students taking an educational course.

In some embodiments, the apparatus includes a multiple course module that uses the data parsing module, the range transform module, the POMP module, the rescaled probability module, the modified logit module, the statistics module, the mean rescaled probability module, the estimated standard probability module, the rescaled value module and the range retransformation module to determine an average score for at least a portion of the m categories for each of one or more educational courses and the reporting module reports the average scores for each educational course.

In other embodiments, a first portion of categories of the m categories comprise a first category group and a second portion of categories of the m categories comprise a second category group and the category summation module averages the estimated scores X̂ of categories of the first category group to determine a first group average score for each of the one or more educational courses and averages the estimated scores X̂ of categories of the second category group to determine a second group average score for each of the one or more educational courses and the reporting module reports the first group average score and the second group average score for each of the one or more educational courses.

In other embodiments, the apparatus includes a correlation module that correlates the first group average score and the second group average score and the reporting module reports the correlation of the first group average score and the second group average score. In other embodiments, the reporting module includes a plotting module that plots a marker for each educational course on a graph on an electronic display where a first axis is first group average scores and a second axis is second group average scores.

In some embodiments, the questions from the questionnaire include assessing engagement of students taking the educational course and the m categories include categories linked to assessment of academic engagement and community engagement of the students. In other embodiments, the categories include content, context, tools, collaboration, theory and knowledge, application and skills, community involvement and expert interaction. In other embodiments, the questions for each category are validated using Exploratory Factor Analysis ("EFA") and Confirmatory Factor Analysis ("CFA") and/or Structural Equation Modeling ("SEM") are used for estimating an effect of academic engagement on students' course success.

In some embodiments, the categories of content, context, tools, collaboration, theory and knowledge, and application and skills make up a curriculum engagement group and the categories of community involvement and expert interaction make up a community engagement group and the category summation module averages the estimated score X̂ of the curriculum engagement group into a curriculum engagement average score and averages the estimated score X̂ of the community engagement group into a community engagement average score and the reporting module reports the curriculum average score and the community engagement average score.

In some embodiments, the apparatus includes a multiple course module that uses the data parsing module, the range transform module, the POMP module, the rescaled probability module, the modified logit module, the statistics module, the mean rescaled probability module, the estimated standard probability module, the rescaled value module and the range retransformation module to determine an average score for the curriculum engagement group and for the community engagement group for each of one or more educational courses and the reporting module reports the curriculum engagement average scores and the community engagement scores for each educational course. In other embodiments, the apparatus includes a correlation module that correlates the curriculum engagement average score and the community engagement average score for one or more of the educational courses and the reporting module reports the correlation of the curriculum engagement average score and the community engagement average score for the one or more educational courses. In other embodiments, the reporting module includes a plotting module that plots a marker for each educational course on a graph on an electronic display where a first axis is curriculum engagement average scores and a second axis is community engagement average scores.

Another apparatus for academic engagement includes a data parsing module that parses answers x from a plurality of questions from a plurality of completed questionnaires. The plurality of questionnaires form a questionnaire group. Answers for each question include discrete numbers from 1 to n and the questions from the questionnaire includes questions for assessing engagement of students taking an educational course. The questions are grouped into questions from a same category and the categories include content, context, tools, collaboration, theory and knowledge, and application and skills in a curriculum engagement group, community involvement and expert interaction in a community engagement group. The apparatus includes a range transform module that determines a transformed scale score x́ for each answer to questions in the questionnaire for the questionnaire group as: x́=x−1 and a proportion of maximum possible ("POMP") module that determines a POMP score p for each answer as:

$$p = \frac{\acute{x}}{n}.$$

The apparatus includes a rescaled probability module that maps a rescaled probability ṕ for each answer as: ṕ=δp+0.5(1−δ), where δ is a scaling constant greater than 0.5 and less than 1 and p is the POMP score. The apparatus includes a modified logit module that determines a modified logit t of the rescaled probability ṕ for each answer as:

$$t = \ln\left(\frac{\acute{p}}{1-\acute{p}}\right)$$

and a statistics module that determines a mean for the modified logit values t for each category of questions from the calculated t values. The apparatus includes a mean rescaled probability module that determines a mean rescaled probability p̀ for each modified logit value t́ as:

$$\grave{p} = \frac{e^{\acute{t}}}{1+e^{\acute{t}}}$$

and an estimated standard probability module that determines an estimated standard probability p̂ for each mean rescaled probability p̀ as:

$$\hat{p} = \frac{\grave{p} + 0.5(\delta - 1)}{\delta}.$$

The apparatus includes a rescaled value module that determines a rescaled transformed scale score x̂ for each estimated standard probability p̂ as: x̂=4p̂ and a range retransformation module that transforms the rescaled transformed scale score x̂ to an estimated score X̂ for each rescaled transformed scale score x̂ as: X̂=x̂+1.

The apparatus includes a category summation module that averages the estimated score X̂ for the curriculum engagement group into a curriculum engagement average score and that averages the estimated score X̂ for the community engagement group into a community engagement average score. The apparatus includes a reporting module that reports the curriculum engagement average score for the questionnaire group and reports the community engagement average score for the questionnaire group. At least a portion of the modules include hardware circuits, programmable hardware circuits and/or executable code, where the executable code is stored on one or more computer readable storage media.

In some embodiments, the questionnaire group includes questionnaires for an educational course and the apparatus includes a multiple course module that uses the data parsing module, the range transform module, the POMP module, the rescaled probability module, the modified logit module, the statistics module, the mean rescaled probability module, the estimated standard probability module, the rescaled value module, the range retransformation module and the category summation module to determine a curriculum engagement average score and a community engagement average score for each of one or more educational courses and the reporting module reports the curriculum engagement average scores and the community engagement scores for each educational course. In other embodiments, the reporting module includes a plotting module that plots a marker for each educational course on a graph on an electronic display where a first axis is curriculum engagement average scores and a second axis is community engagement average scores.

A method for academic engagement includes parsing answers x from a plurality of questions from a plurality of completed questionnaires. The answers are from questionnaire group. Answers for each question are discrete numbers from 1 to n. The method includes determining a transformed scale score for each answer to questions in the questionnaire for the questionnaire group as: x́=x−1, determining a proportion of maximum possible ("POMP") score p for each answer as:

$$p = \frac{\acute{x}}{n}$$

and mapping a rescaled probability ṕ for each answer as: ṕ=δp+0.5(1−δ), where δ is a scaling constant greater than 0.5 and less than 1 and p is the POMP score. The method includes determining a modified logit t of the rescaled probability ṕ for each answer as:

$$t = \ln\left(\frac{\acute{p}}{1-\acute{p}}\right),$$

determining a mean for the modified logit values t́ for each question group for the questionnaire group from the modified logit t values and determining a mean rescaled probability p̀ for each determined mean for modified logit values t́ as:

$$\grave{p} = \frac{e^{\acute{t}}}{1+e^{\acute{t}}}.$$

The method includes determining an estimated standard probability $\hat{p}$ for the mean rescaled probability $\acute{p}$ as:

$$\hat{p} = \frac{\acute{p} + 0.5(\delta - 1)}{\delta},$$

determining a rescaled transformed scale score $\hat{x}$ for the estimated standard probability $\hat{p}$ as: $\hat{x}=4\hat{p}$ and transforming the rescaled transformed scale score to an estimated $\hat{X}$ for each rescaled transformed scale score $\hat{x}$ as: $\hat{X}=\hat{x}+1$. The method includes reporting the estimated $\hat{X}$ for each question group of the questionnaire group.

In some embodiments, the question group includes a group of questions from a same category of questions and the questionnaire includes m categories of questions and a first portion of categories of the m categories form a first category group and a second portion of categories of the m categories form a second category group. In the embodiment, the method includes averaging the estimated scores $\hat{X}$ of categories of the first category group to determine a first group average score for each of the one or more educational courses and averaging the estimated scores $\hat{X}$ of categories of the second category group to determine a second group average score for each of the one or more educational courses. In the embodiment, the method includes plotting a marker for each educational course on a graph on an electronic display where a first axis is first group average scores and a second axis is second group average scores.

FIG. 1 is a schematic block diagram illustrating one embodiment of a system 100 for academic engagement. The system 100 includes an academic engagement apparatus 102 in a server 104, a computer network 106, a client 108, electronic displays 110, keyboards 112, and mice 114, which are described below.

The system 100 includes an academic engagement apparatus 102 which parses data from questionnaires filled out by students of educational course and uses a logit transformation method to constructing confidence intervals that would be asymmetric and not dependent upon normal curve theory. The academic engagement apparatus 102 measures curriculum and community engagement within the classroom. From identified factors of engaged learning and from answers from questionnaires filled out by students of numerous educational courses, a valid instrument in the form of particular questions to be include in a questionnaire was created and validated. Exploratory Factor Analysis ("EFA") and Confirmatory Factor Analysis ("CFA") were used to develop and refine the instrument and create a measurement model that measures academic engagement and community engagement along with student success and/or faculty performance. Structural Equation Modeling ("SEM") is used for estimating an effect of academic engagement on students' course success and is used each time data is collected for educational courses. A separate SEM model is created, in some embodiments, for each college, as needed. The measurement model was reduced to curriculum and community engagement to focus on assessment and type of in-class engagement and not to assess students and faculty individually. A course that scores high in curriculum and community engagement generally have a positive effect on a student's class grades. The academic engagement apparatus 102 is described in more detail below with respect to the apparatuses 200, 300 of FIGS. 2 and 3.

The system 100 includes a server 104 that executes the academic engagement apparatus 102. The server 104 includes one or more processors, memory, a network interface, storage and other typical components of a computer. In some embodiments, the server 104 is accessible by a client 108 through a computer network 106. In other embodiments, the server 104 is directly accessible by a user through input/output devices, such as an electronic display 110, a keyboard 112, a mouse 114, speakers (not shown), etc. In some embodiments, the server 104 is a mainframe computer with multiple processors and may include one or more virtual machines running on the processors, each acting as a separate computing device. The server 104, in some embodiments, is in a cloud computing environment. In other embodiments, the server 104 is a workstation, a desktop computer, a laptop computer, a tablet computer and the like. In some embodiments, the server 104 is a standalone device without a connection to a client 108.

In some embodiments, the academic engagement apparatus 102 may incorporated onto any computing device capable of executing the academic engagement apparatus 102. The academic engagement apparatus 102, in some embodiments, includes software modules stored on non-transitory computer readable storage media and is executed by the server 104 or other computing device. In other embodiments, the academic engagement apparatus 102 is implemented using an ASIC, FPGA or other programmable hardware device. One of skill in the art will recognize other platforms appropriate for the academic engagement apparatus 102.

The computer network 104, in some embodiments, includes a LAN, a WAN, a cellular network, an optical fiber network, a satellite network, a wireless network, the Internet, etc. and any combination thereof. The computer network 104 may include routers, switches, servers, cabling and other networking equipment.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The client 108, in some embodiments, is a computing device that has a network connection to the server 104 and that accesses the server 104 and the academic engagement apparatus 102. The client 108 may be a laptop computer, a desktop computer, a workstation, a smartphone, a tablet computer, and the like. The client 108 is accessed by a user using input/output devices, such as an electronic display 110, a keyboard 112, a mouse 114, etc. In some embodiments, a user may access the academic engagement apparatus 102 as if the user was sitting next to the server 104. One of skill in the art will recognize other implementations of a client 108.

Figure 2:
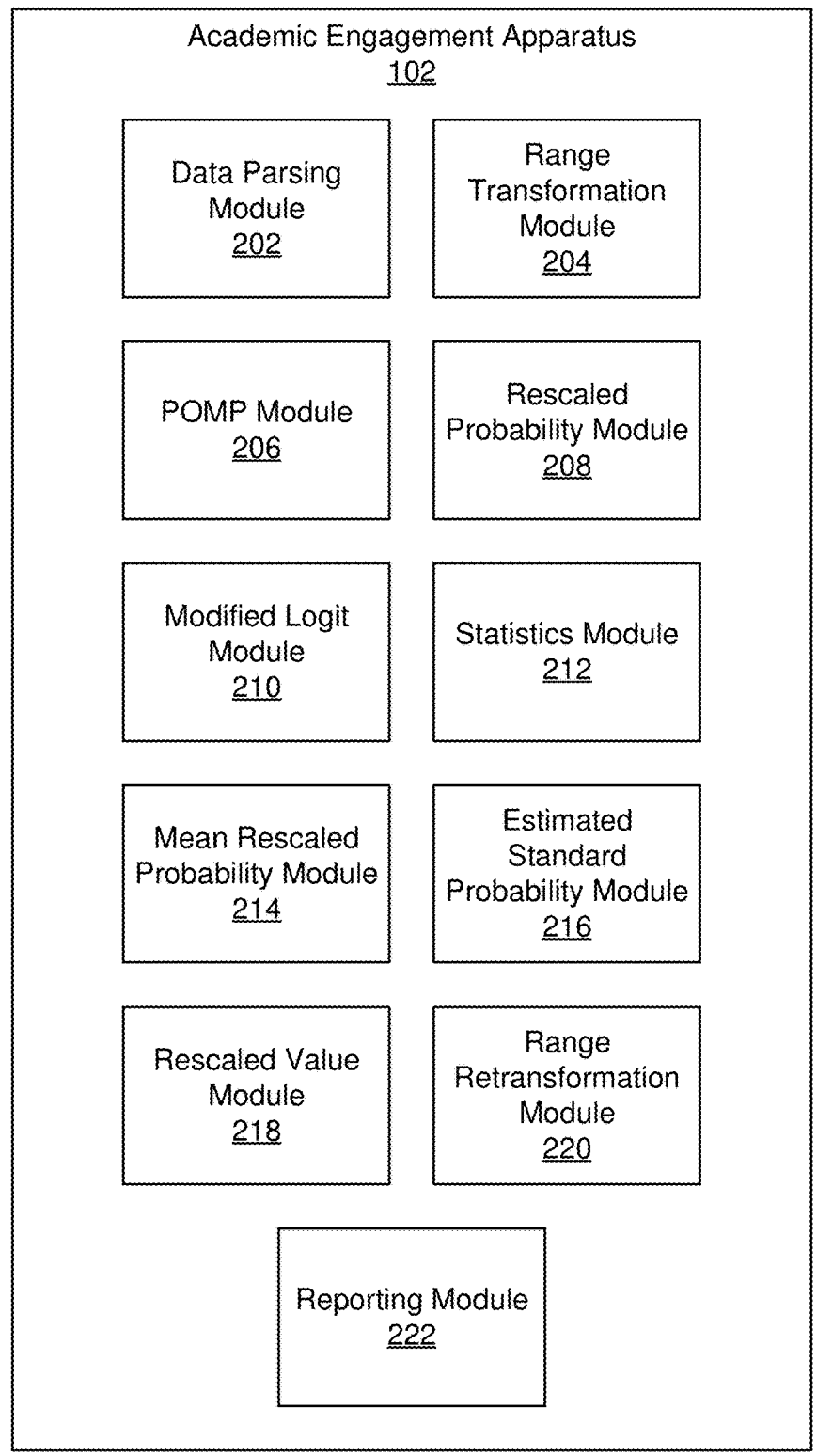
FIG. 2 is a schematic block diagram illustrating one embodiment of an apparatus for academic engagement.

FIG. 2 is a schematic block diagram illustrating one embodiment of an apparatus 200 for academic engagement. The apparatus 200 includes an embodiment of the academic engagement apparatus 102 with a data parsing module 202, a range transformation module 204, a proportion of maximum possible ("POMP") module 206, a rescaled probability module 208, a modified logit module 210, a statistics module 212, a mean rescaled probability module 214, an estimated standard probability module 216, a rescaled value module 218, a range retransformation module 220, and the reporting module 222, which are described below.

The apparatus 200 includes a data parsing module 202 that parses answers "x" from a plurality of questions from a plurality of completed questionnaires. The answers x for each question are bounded and are discrete numbers from 1 to n. For example, the answers x may include a score from 1 to 5 where each score represents agreement with a question of the questionnaire. For example, a 1 may be a low rating, a 2 a higher rating, a 3 a midpoint rating, a 4 a high rating, and a 5 a best rating. In one example, the question may be "Most course content was valuable and worth learning" and the answers may be 1: disagree, 2: somewhat disagree, 3: neutral, 4: mostly agree, and 5: agree. In the embodiment, answers between 1 and 5 for each question are structured so that 1 is a low score and 5 is a high score. In other embodiments, the scale may be 1 to 10, 1 to 7, or other appropriate range. In some embodiments, a 1 is a highest score and n is a lowest score. In the embodiment, the students are allowed to pick a discrete number and not fractions between discrete numbers. For example, an answer of 3.5 would not be acceptable.

The answers x are from one or more questions form a question group. For example, the question group may be a category and one or more questions apply to the category. For example, if a category is collaboration, one or more questions in the questionnaire may pertain to collaboration. In some embodiments, a question group includes two or more categories. As will be discussed below, a curriculum engagement group may include categories of content, context, tools, collaboration, theory and knowledge, and application and skills, and a community engagement group may include the categories of community involvement and expert interaction. Each category includes one or more questions pertaining to the category, so for example, the category of context may include five questions in the category of content, 6 questions in the category of tools, etc. In some embodiments, each category includes a minimum of three questions.

The plurality of questionnaires form a questionnaire group. For example, a questionnaire group may include completed questionnaires from a single course taught at one time. In another example, the questionnaire group includes completed questionnaires from two or more classes taught by a same teacher. In another example, the questionnaire group includes completed questionnaires from several classes that are for the same subject matter (i.e. may include the same course number) that are taught by two or more teachers. In another example, the questionnaire group includes completed questionnaires for courses from a particular college or department within a university (i.e. a medical school within a university). One of skill in the art will recognize other ways to group completed questionnaires.

In some embodiments, the questionnaire includes questions for assessing engagement of students taking an educational course. The questions include categories of content, context, tools, collaboration, theory and knowledge, application and skills, and community engagement. In one embodiment, the categories are divided into two question groups as described above with a curriculum engagement group that includes categories of content, context, tools, collaboration, theory and knowledge, and application and skills, and a community engagement group that includes the categories of community involvement and expert interaction.

In some embodiments, the data parsing module 202 receives information from completed questionnaires electronically. For example, the questionnaires may be completed on a computing device and the apparatus 200 may provide students a questionnaire to complete electronically. In another embodiment, the questionnaires are filled out on paper and then scanned and the data parsing module 202 receives data from the scanned questionnaires. The questionnaires include student identification information, information that identifies which educational course was completed or is in process of completion by a student, when the course was offered, and/or other identifying information that allows the data parsing module 202 to properly group answers to completed questions from the questionnaires into question groups, questionnaire groups, etc.

In some embodiments, the data parsing module 202 organizes answers to questions from the questionnaire into a database, table or other data structure. For example, the data parsing module 202 may enter answers from a questionnaire into a line of a table along with identifying information about the student, course, etc. In other embodiments, the data parsing module 202 groups answers into vectors of a matrix. The data parsing module 202 includes instructions to organize the answers into a format in non-volatile storage for use by other modules of the apparatus 200.

The apparatus 200 includes a range transformation module 204 that determines a transformed scale score for each answer to questions in the questionnaire for the questionnaire group. The range transformation module 204, in one embodiment, starts with the answers x in a vector $x=\{x_1, \ldots x_n\}$ and then subtracts "1" from each answer as follows:

$$\acute{x}=x-1 \qquad (1)$$

The resultant vector $\acute{x}$ has a new range from 0 to n. For example, if the maximum score is n=5, an initial range of answers is 1 to 5 and the resultant vector $\acute{x}$ has a new range from 0 to 4. The initial answer vector x is skewed and the resultant vector $\acute{x}$ is adjusted for the lowest score being "1." The range transformation module 204, in one embodiment, applies equation 1 to the initial vector x using matrix operations and stores the resultant vector $\acute{x}$ in non-volatile storage. Where the data parsing module 202 stores answers in columns where the answers from each questionnaire are stored in rows, the range transformation module 204 applies equation 1 to a matrix of answers with a resultant matrix $\acute{x}$. In other embodiments, the range transformation module 204 retrieves each answer one at a time and applies equation 1. One of skill in the art will recognize other ways for the range transformation module 204 to apply equation 1 to answers x.

The apparatus 200 includes a proportion of maximum possible ("POMP") module 206 that determines a POMP score p for each answer as:

$$p = \frac{\acute{x}}{n} \quad (2)$$

The answers x that have been transformed into a transformed scale score x́ are then transformed to range from 0 to 1. For example, the POMP module 206 may manipulate a single answer, a vector or matrix x́ by dividing each value by n and then storing a resultant answer, vector or matrix p.

The apparatus 200 includes a rescaled probability module 208 that maps a rescaled probability ṕ for each answer as:

$$\acute{p} = \delta p + 0.5(1-\delta) \quad (3)$$

For equation 3, where δ is a scaling constant greater than 0.5 and less than 1 and p is the POMP score. In one embodiment, δ is 0.95. Answers of 0 or 1 transform to -∞ and +∞ respectively, which cause errors in natural log functions for a computer, so adding some small value δ to the numerator and denominator avoids this problem. The rescaled probability module 208 retrieves the POMP score p, which may be a vector, a matrix, a single value, etc. and applies equation 3 and to determine the rescaled probability ṕ for each answer and stores the resultant values in an appropriate data structure.

The apparatus 200 includes a modified logit module 210 that determines a modified logit t of the rescaled probability ṕ for each answer as:

$$t = \ln\left(\frac{\acute{p}}{1-\acute{p}}\right) \quad (4)$$

The modified logit module 210 also transforms single values, a vector or matrix to create the modified logit t into another single value, vector or matrix and stores the modified logit t.

The apparatus 200 includes a statistics module 212 that determines a mean for the modified logit values t̄ for each question group for the questionnaire group from the modified logit t values. For example, the statistics module 212 divides answers of an answer group by the number of answers. If there are s answers in a question group of a questionnaire group, the statistics module 212 divides each modified logit t by s and stores the mean. In other embodiments, the statistics module 212 also determines a standard deviation, confidence interval, or other statistical value from the modified logit t based on the number of answers for a particular question group and questionnaire group. The statistic module 212 stores the mean and/or other statistics with an indicator of which modified logit t the mean and/or statistics are derived. The statistics module 212, in some embodiments, determines a mean for each question group of a questionnaire group.

In some embodiments, the questionnaire has m categories of questions and the statistics module 212 determines a mean for the modified logit values t̄ for each of the m categories. In other embodiments, the m categories are for academic engagement and include content, context, tools, collaboration, theory and knowledge, application and skills, community involvement and expert interaction.

The apparatus 200 includes a mean rescaled probability module 214 that determines a mean rescaled probability p̂ for each determined mean for modified logit values t̄ as:

$$\hat{p} = \frac{e^{\bar{t}}}{1+e^{\bar{t}}} \quad (5)$$

The mean rescaled probability module 214 performs the function of equation 5 on each mean and other statistic calculated by the statistics module 212 mean rescaled probability p̂ and stores the results in an appropriate format.

The apparatus 200 includes a rescaled value module 216 that determines a rescaled transformed scale score x̂ for the estimated standard probability p̂ as:

$$\hat{x} = 4\hat{p} \quad (6)$$

The rescaled value module 216 determines a rescaled transformed scale score x̂ for each estimated standard probability p̂ and stores the results.

The apparatus 200 includes a range retransformation module 218 that transforms the rescaled transformed scale score x̂ to an estimated X̂ for each rescaled transformed scale score x̂ as:

$$\hat{X} = \hat{x} + 1 \quad (7)$$

The range retransformation module 218 uses equation 7 for each rescaled transformed scale score x̂ and stores the results. Thus, each calculated mean by the statistics module 212 are transformed to be on a same range of 0 to n as the original answers.

The apparatus 200 includes a reporting module 222 that, in some embodiments, reports the estimated score k for each question group and/or category of the questionnaire group. For example, the reporting module 222 may display the estimated X̂ for each question group of the questionnaire group on an electronic display 110. The estimated score X̂ for each question group of the questionnaire group may be displayed in a format that identifies each question group and the questionnaire group to a user. In another embodiment, the reporting module 222 stores the estimated X̂ for each question group of the questionnaire group in a location accessible to a user. In other embodiments, the reporting module 222 provides the estimated X̂ for each question group of the questionnaire group to another module for further processing. In some embodiments, the question group includes a group of questions from a same category of questions and the reporting module 222 reports the estimated score X̂ of the category of questions. One of skill in the art will recognize other ways that the reporting module 222 reports the estimated score X̂ for each question group of the questionnaire group.

Figure 3:
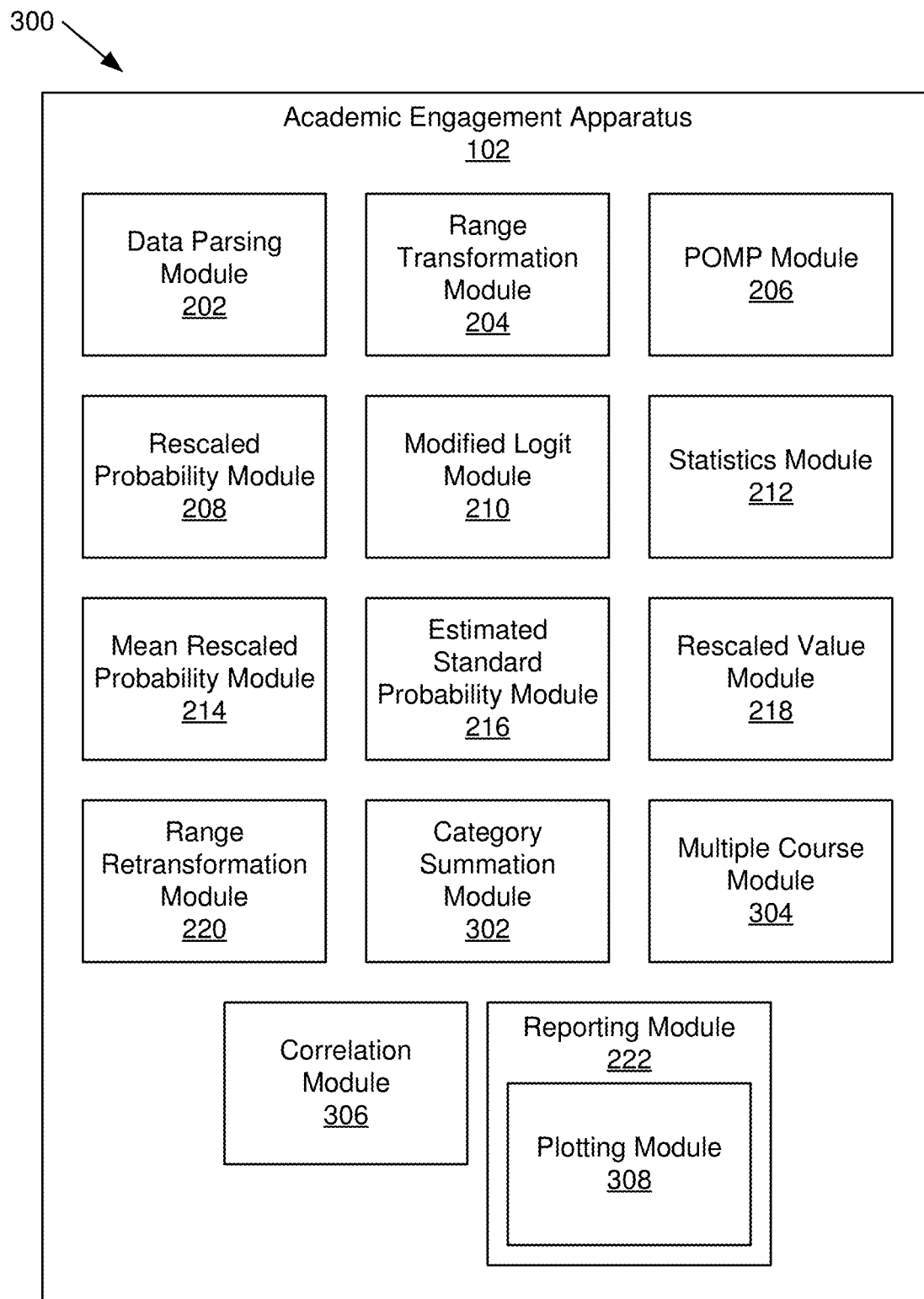
FIG. 3 is a schematic block diagram illustrating another embodiment of an apparatus for academic engagement.

FIG. 3 is a schematic block diagram illustrating another embodiment of an apparatus 300 for academic engagement. The apparatus 300 includes another embodiment of the academic engagement apparatus 102 with a data parsing module 202, a range transformation module 204, a proportion of maximum possible ("POMP") module 206, a rescaled probability module 208, a modified logit module 210, a statistics module 212, a mean rescaled probability module 214, an estimated standard probability module 216, a rescaled value module 218, a range retransformation module 220, and the reporting module 222, which are substantially similar to those described above in relation to the apparatus 200 of FIG. 2. The apparatus 300 also includes a category summation module 302, a multiple course module 304, a correlation module 306 and/or a plotting module 308, which are described below.

In some embodiments, the questionnaire has m categories of questions and the apparatus 300 includes a category summation module 302 that averages the estimated score $\hat{X}$ of at least a portion of the m categories into an average score and reports the average score of the at least a portion of the m categories. For example, questionnaire may include five categories and the category summation module 302 may sum the estimated $\hat{X}$ of the five categories and divide the total by five. In other embodiments, the questionnaire includes two or more groups of categories and the category summation module 302 averages the estimated score $\hat{X}$ of each category group.

In some embodiments, the categories of content, context, tools, collaboration, theory and knowledge, and application and skills form a curriculum engagement group and the categories of community involvement and expert interaction form a community engagement group and the category summation module 302 averages the estimated score $\hat{X}$ of the curriculum engagement group into a curriculum engagement average score and averages the estimated $\hat{X}$ of the community engagement group into a community engagement average score and the reporting module 222 reports the curriculum average score and the community engagement average score by displaying, storing, etc. the curriculum average score and the community engagement average score. The questionnaire, in some embodiments, includes other category groups and the category summation module 302 averages the estimated score $\hat{X}$ of each category group.

The apparatus 300, in some embodiments, includes a multiple course module 304 that uses the data parsing module 202, the range transform module 204, the POMP module 206, the rescaled probability module 208, the modified logit module 210, the statistics module 212, the mean rescaled probability module 214, the estimated standard probability module 216, the rescaled value module 218 and the range retransformation module 220 to determine an average score for at least a portion of the m categories for each of one or more educational courses and the reporting module 222 reports the average scores for each educational course.

In some embodiments, the questionnaire group is an educational course and questionnaires are distributed to students of multiple educational courses and the multiple course module 304 uses the modules 202-218 of the apparatus 200 of FIG. 2 for each educational course and the reporting module 222 reports average scores for each category group for each educational course. In other embodiments, the reporting module 222 groups average scores by certain divisions, such as by common subject matter, by department, by college in a university, by university, etc. The reporting module 222 displays the average scores in various formats on an electronic display 110. In some examples, the reporting module 222 provides an interactive display that allows a user to view average scores in various divisions, compared against each other, etc. For example, the reporting module 222 may display average scores of various universities to be compared to each other.

In other embodiments, the reporting module 222 provides an interactive display that allows a user to drill down into various groups. For example, a user may select a particular university and the reporting module 222 displays the average score of the university. The user may then drill down, using the reporting module 222, to the various colleges of the university, such as a college of science and engineering college, a medical school, etc. The user may then drill down, using the reporting module 222, within, for example the college of science and engineering, to the electrical engineering department and the reporting module 222 may then display average scores for each course, for each group of courses, etc. The user may also drill down, using the reporting module 222, to a particular course and view average scores of category groups, of categories, etc. One of skill in the art will recognize other functions of the reporting module 222.

In some embodiments, the multiple course module 304 uses the modules 202-218 of the apparatus 200 of FIG. 2 to determine an average score for the curriculum engagement group and for the community engagement group for each of one or more educational courses. The reporting module 222 reports the curriculum engagement average scores and the community engagement scores for each educational course.

The apparatus 300 includes, in some embodiments, a correlation module 306 that correlates a first group average score and a second group average score and the reporting module 222 reports the correlation of the first group average score and the second group average score, which provides useful information in judging the relatedness of the first group average score and the second group average score. In some embodiments, the correlation module 306 correlates the curriculum engagement average score and the community engagement average score for one or more of the educational courses and the reporting module 222 reports the correlation of the curriculum engagement average score and the community engagement average score for the one or more educational courses.

The reporting module 222, in some embodiments, includes a plotting module 308 that plots a marker for each educational course on a graph on an electronic display 110 where a first axis is first group average scores and a second axis is second group average scores. The graph is useful to visually display correlation of the first group average scores and the second group average scores. In some examples, the plotting module 220 plots a marker for each educational course on a graph on an electronic display 110 where a first axis is curriculum engagement average scores and a second axis is community engagement average scores.

Figure 4:
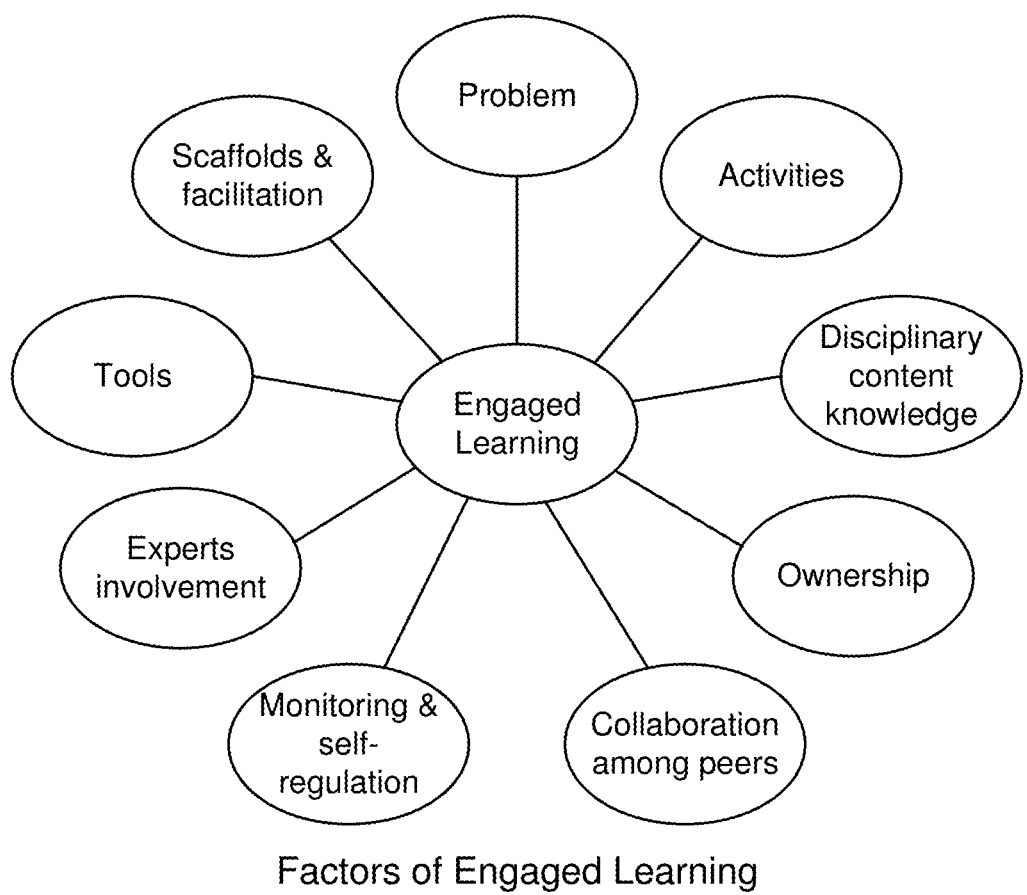
FIG. 4 is a diagram depicting factors of engaged learning.

FIG. 4 is a diagram depicting factors of engaged learning proposed by Hung, D., et al. (2004). The factors of engaged learning proposed by Hung were identified as main factors of engaged learning to create an engaging learning experience for students, which typically translates to increased learning by the students. The factors of engaged learning were used as a starting point in determining an appropriate model for academic engagement using questionnaires distributed to students taking educational courses at Utah Valley University from 2015 to 2016. The factors of engaged learning along with other literature were searched to determine a reliable and valid instrument that includes questions to be included in a questionnaire.

Figure 5:
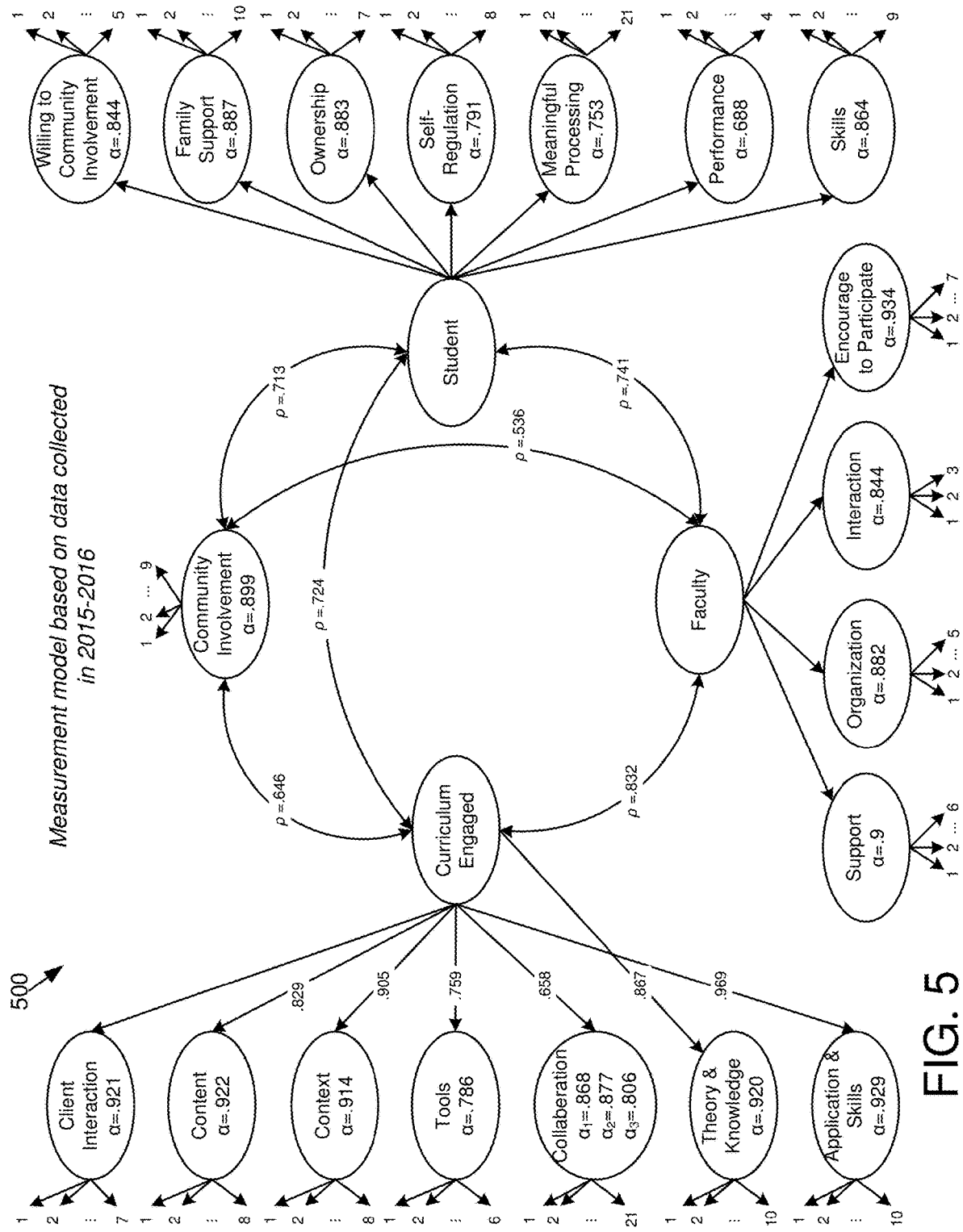
FIG. 5 is a schematic block diagram illustrating one embodiment of a second-order measurement model for determining academic engagement correlations for educational courses.

FIG. 5 is a schematic block diagram illustrating one embodiment of a second-order measurement model 500 for determining academic engagement correlations for educational courses. The second-order measurement model 500 is a measurement model used to gauge academic engagement and community engagement by gathering data using an engagement instrument that includes questions to be administered in a questionnaire.

Questions in the engagement instrument are worded in generic form that can be applied to any discipline, and allowing academic/teaching freedom for the faculty. The instrument does not measure individuals or performance.

The engagement instrument is based on student self-report about the level and type of engagement of the class. The engagement instrument was administered using Qualtrics®, where the link is integrated into Canvas® as part of course activities. Some courses did not choose to incorporate the survey in Canvas; in this case, they had access to a survey link using Qualtrics to take the survey in the class. Colleges administer the survey every semester, to maximize the response rate, and be able to eventually designate the courses. Administration of a questionnaire typically takes place in the last third of a semester, where students experience most of the course's activities. It is not recommended to administer the instrument at the beginning of the semester, because the students typically will not be able to answer the questions.

After the data collection was complete, the data was cleaned for any issues that may affect the analysis, such as duplication, decline to participate, and accept but not taking the survey (note: this is different from missing values). The data was assessed regarding missing values. According to the type of pattern of missingness, data imputation was conducted where needed. The method used a k-Nearest Neighbor imputation that works on a variation of the Gower Distance for numerical, categorical, ordered and semi-continuous variables.

The next step was to conduct Exploratory Factor Analysis ("EFA") replication procedure to confirm the model hypothesized. Using EFA criteria, the engagement instrument was cleaned from redundancy, bad-worded items, highly correlated items, etc. This procedure was performed for every factor. The EFA was conducted once, and is not needed for every data administration.

After confirmation of the hypothesized model, Confirmatory Factor Analysis ("CFA") was conducted to test the construct validity of the factors representing academic and community engagement. Different parameters were used to evaluate the CFA, and Structural Equation Modeling ("SEM") model fit, Comparative Fit Index (CFI) and Tucker-Lewis Index ("TLI") as relative fit indices, Root Mean Square Error of Approximation ("RMSEA") as parsimony corrected fit indices, Standardized Root Square Mean Residual ("SRMR") as an absolute fit index, and finally, Cronbach's alpha coefficient was examined for each factor.

The second-order measurement model 500 is a result of the analysis listed above. The second-order measurement model 500 includes categories of client interaction, content, context, tools, collaboration, theory & knowledge, and application & skills, which are in a category group of curriculum engaged. The second-order measurement model 500 includes categories of support, organization, interaction, and encourage to participate in a category group of faculty. The second-order measurement model 500 includes categories of willing to community involvement, family support, ownership, self-regulation, meaningful processing, performance, and skills in a category group of student. The first order module 500 includes a category of community involvement that is also a category group. The numbers next to each category indicate questions within the category. For example, the content category includes 8 questions.

Multiple group invariance of the second order model 500 was tested for different groups (i.e. gender, employment, and ethnicity). Measurement invariance was tested to see any differences between groups, by factor and by items. Investigation was used to determine whether groups differ on average score of academic and community engagement, and difference in responses to specific items. Developing the structural equation model 600 started with assessing the measurement model using Mplus® (Muthen & Muthen, 2010) to uncover the underlying structure of the latent variables (i.e. categories) Content, Context, Theory and Knowledge, Application and Skills, Tools, Collaboration, Client Interaction, Community Involvement. Using random sub-sample pulled from the second-order measurement model 500, Exploratory Factor Analysis ("EFA") was again used to generate hypotheses about the underlying factor structure including the number of factors to retain, which items appear to load on which factor, and the correlation between the factors. The aim is to minimize variable complexity and maximize factor complexity. Hence, Geomin Rotation was used because it is developed to the variable complexity and worked well with distinct clusters. Based on theory, scree plots, eigenvalues, factor loadings, and model fit the results from the EFA; several candidates of psychometric models were identified and compared against specific criterion to determine the number of factors for each model.

After an appropriate model was hypothesized based on the results of the EFA, CFA was conducted using the total sample to determine the proposed measurement model to decide whether the second order model 500 was needed to account for the correlations among any first-order factors, and to determine if any correlated errors should be specified in the model.

A next step was Model fit and model comparisons. The most commonly used test to check global model fit is the chi-square test, but the chi-square test is dependent on sample size. The chi-square test rejects reasonable models if the sample is large and it fails to reject poor models if the sample is rather small. Furthermore, the chi-square test cannot be used for non-nested models, instead, three other types of fit indices that can be used to assess the fit of a model.

Different parameters were compared to evaluate the EFA, CFA, and SEM model fit. Comparative Fit Index ("CFI") and Tucker-Lewis Index ("TLI") as relative fit indices, Root Mean Square Error of Approximation ("RMSEA") as parsimony corrected fit indices, Standardized Root Square Mean Residual ("SRMR") as an absolute fit index were used and compared. Indices that are less sensitive to sample size were relied upon. Further, because SRMR is not available for SEM categorical outcome testing in Mplus, this model specification index will be used only to evaluate the measurement model only. Although values of 0.06 or less are considered an adequate fit for SRMR and RMSEA, values of 0.05 or less represent a more conservative choice. A value of 0.95 and above is considered an excellent fit for CFI and TLI. Also, a 3.0 value or less represents the best ratio for $\chi^2/df$. To compare non-nested CFA models, Akaike Information Criterion ("AIC", Bayesian Information Criterion ("BIC", and Sample-Size Adjusted Bayesian Information Criterion ("ABIC") are usually used, but they are not applicable for categorical data. Adequacy of factor loadings was examined for all models. Although factor loadings exceeding 0.40 are considered acceptable. However, because we are very selective for a very good items, we decided to adopt a more conservative standard of 0.6.

Finally, Cronbach's alpha coefficient was examined for each scale. Researchers reported that all reliabilities that exceeded 0.70 criterion suggested by Nunnally (1978) were considered acceptable assuming that scales with 0.70 and above reliability maintained adequate internal consistency reliabilities. However, Nunnally suggested that the intended use of the scale determines the satisfactory level of reliability. Henceforth, appropriateness of the acceptable reliability is determined by researchers according to the measurement context as suggested by John & Benet-Martinez, 2000 and Schmitt, 1996. Missing data imputation involved imputing missing responses. The method used a k-Nearest Neighbor imputation that works on a variation of the Gower Distance for numerical, categorical, ordered and semi-continuous variables.

Figure 6:
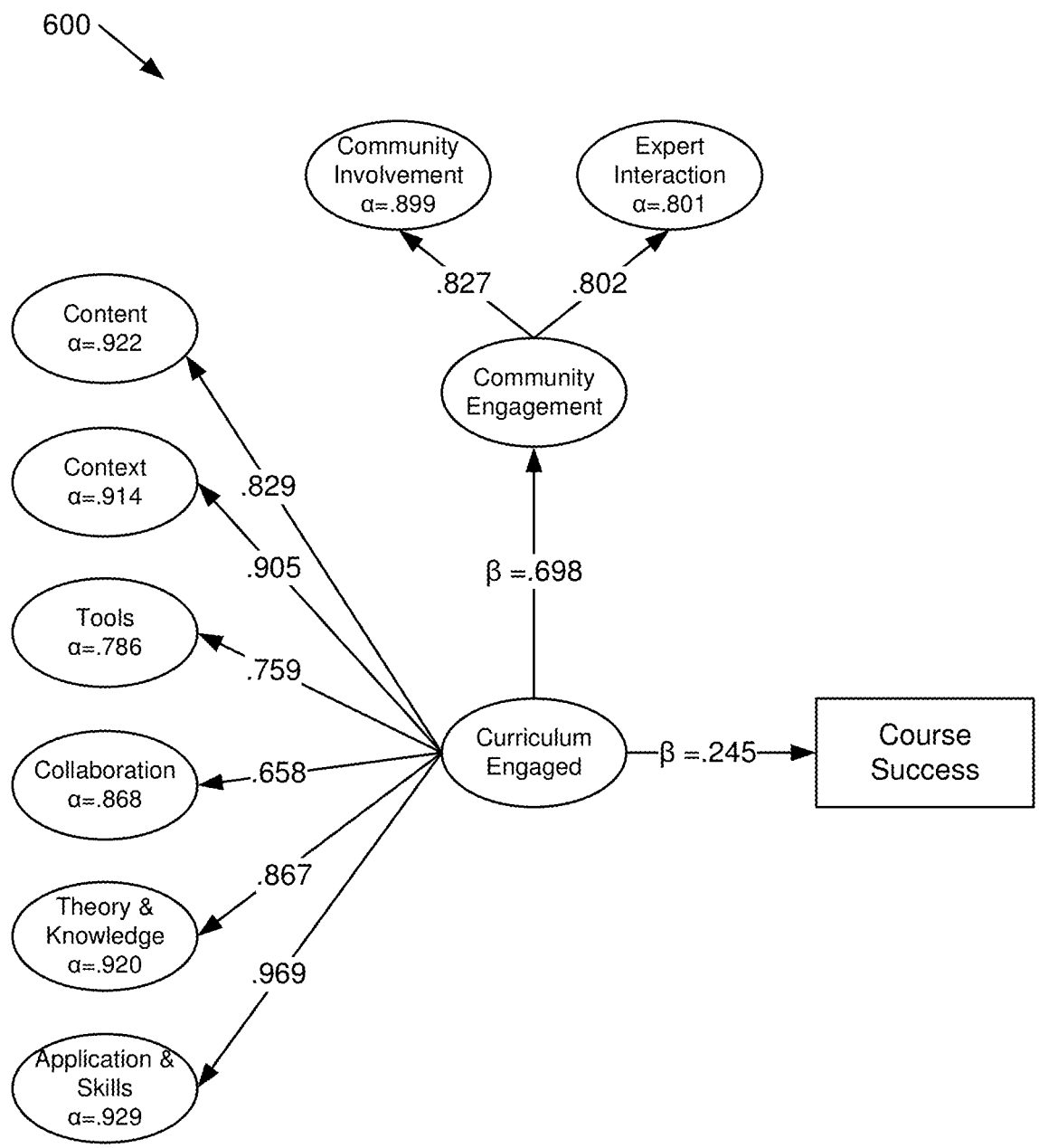
FIG. 6 is a schematic block diagram illustrating one embodiment of a structural equation model for determining the effect of classroom engagement on students' course success.

FIG. 6 is a schematic block diagram illustrating one embodiment of a structural equation model 600 for determining the effect of classroom engagement on students' course success. A next step was to create a structural equation model 600, which represent the academic engagement and community engagement, by developing the measurement model that includes the correlation between academic engagement and community engagement, and assess the model fit using the criteria mentioned above. From the larger measurement model (i.e. the second-order measurement model 500), of interested were the curriculum and community engagement part of the measurement model 500. This structural equation model 600 does not measure faculty performance, nor students' progress in a class. The structural equation model 600 is a general measure of elements that are described as engaging activities in the classroom.

Questions of the structural equation model 600 again are designed to apply to any course because they are worded in a general form. The questions are not specific to a particular course. One course does not have to be high on all factors; some courses are designed to be high on one end but not the other. A purpose of the structural equation model 600 is to designate courses with their level and type of engagement across a continuum or quadratic to locate these courses within the academic and community engagement definition.

Data aggregation on different levels is used to describe a degree of uncertainty associated with estimates of the mean composite rating of academic and community engagement averaged across the number of responding students in each section, course, college, and university. Given the nature of rating distributions which have skewed distribution, and bounded between 1 and 5. Estimating a margin of error using methods that are based on the central limit theorem ("CLT") is inappropriate and suffer from several deficiencies including the small number of raters, the bounded nature of the rating scale items, and the standard error represented in the measurement. To provide accurate results from the psychometric properties of the aggregated ratings on each level, a logit transformation method was to address these issues, which are included in the apparatuses 200, 300 of FIGS. 2 and 3. The results from the logit transformation method include average academic and community engagement associated with confidence interval on section, course, college and university levels.

The structural equation model 600 depicted in FIG. 6 includes categories of content, context, tools, collaboration, theory & knowledge and application & skills in a curriculum engagement group and categories of community involvement and expert interaction in a community engagement group. The curriculum engagement group and the community engagement group are correlated as depicted. Course success in terms of an effect of engagement on grades is also depicted, which indicates a positive effect of academic engagement on students' grades. Thus, the structural equation model 600 provides a measurement of academic engagement, which correlates to students' grades. Thus, courses with little academic engagement have less of an effect on students' grades than courses with a high degree of academic engagement.

Figure 7:
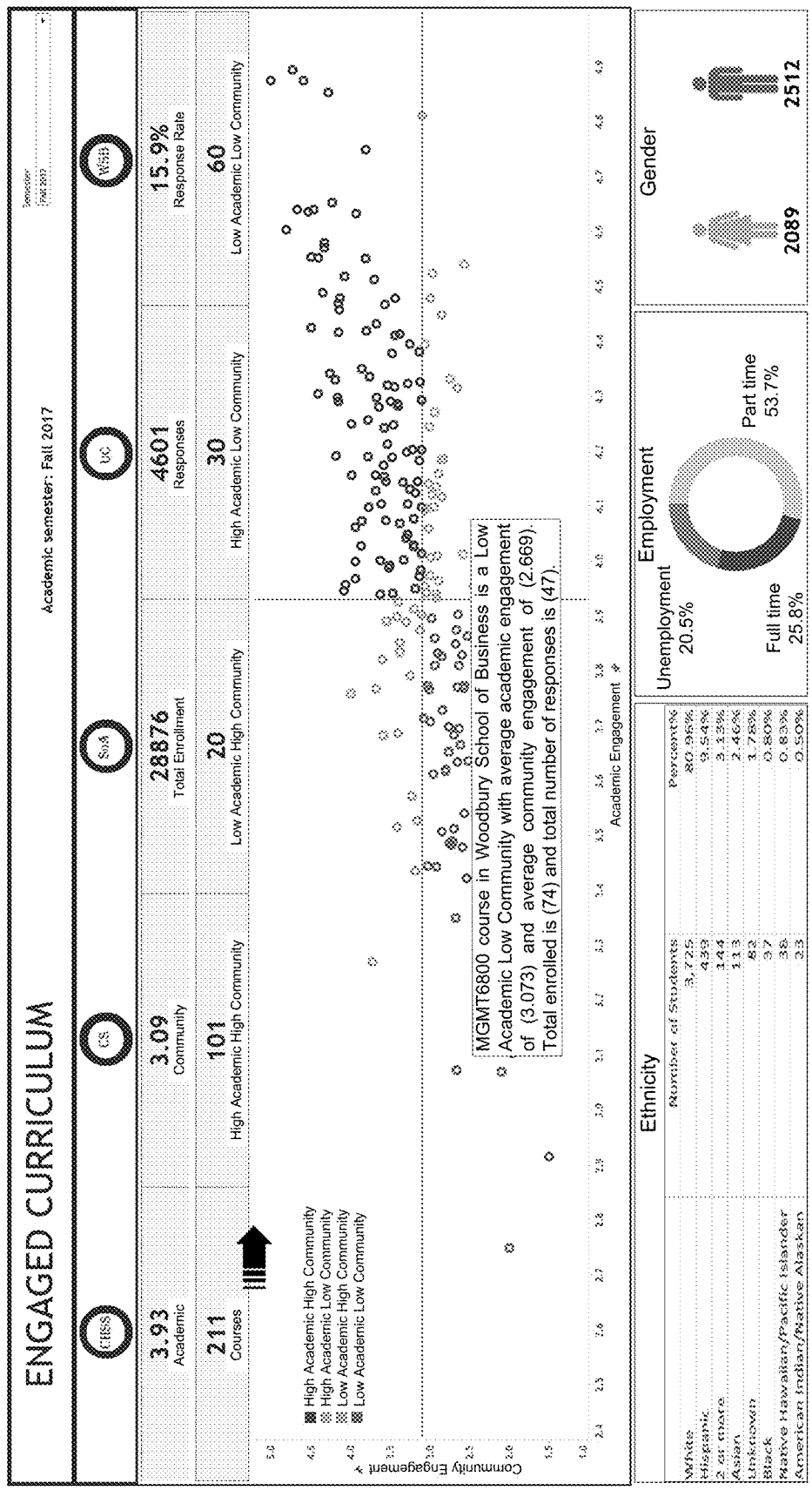
FIG. 7 is a screenshot of a display from an apparatus for determining classroom engagement where academic engagement is plotted against community engagement for numerous educational courses.

FIG. 7 is a screenshot 700 of a display from an apparatus 102, 200, 300 for determining classroom engagement where academic engagement is plotted against community engagement for numerous educational courses. Academic engagement, which is in terms of curriculum engagement average scores, is along the horizontal axis and community engagement, which is in terms of community engagement average scores, is along the vertical axis. (In the screenshot 700 of FIG. 7, academic engagement is interchangeable with curriculum engagement). For example, the plotting module 308 may be used to plot the graph depicted in FIG. 7. Each circle on the graph represents a particular course. A course MGMT 6800 in the lower left quadrant, which represents low academic engagement and low community engagement, is selected and a box with information about the MGMT 6800 course is included. The box indicates that the average academic engagement is 3.073 and the average community engagement is 2.669. The box also indicates that the total enrollment was 74 with a total number of responses of 47.

The screenshot 700 of FIG. 7 is for a university and also depicts other information about the university, such as ethnicity, employment, gender, courses, and the like. Average academic engagement for the university is listed as 3.93 and average community engagement for the university is listed as 3.09. In some embodiments, the apparatuses 200, 300 are used to generate information and the reporting module 222 along with the plotting module 308 are used, in some embodiments, to provide an interactive tool as depicted in FIG. 7. Note that a user is able to select any circle in the graph to find information about a particular course.

Figure 8:
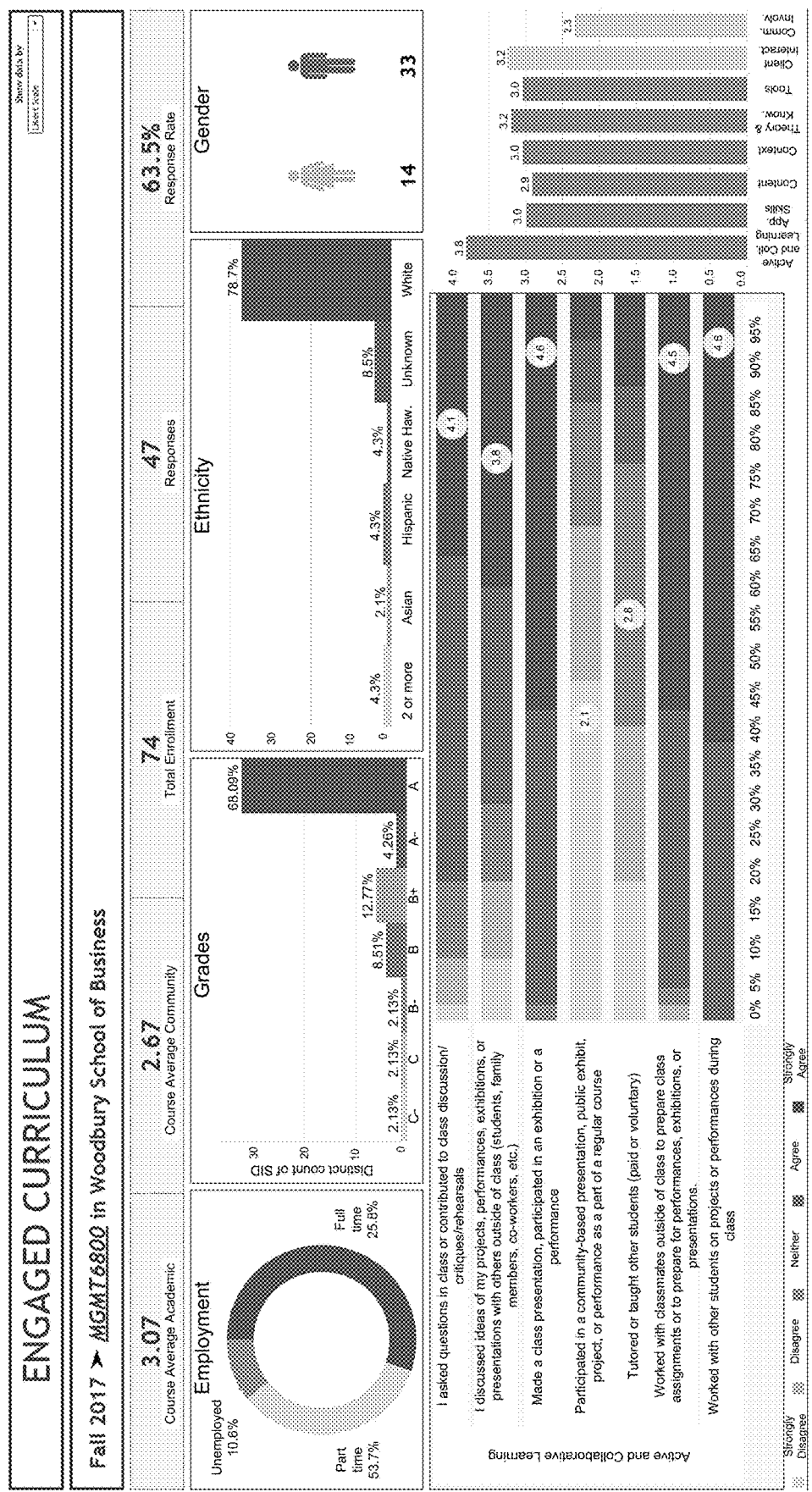
FIG. 8 is a screenshot of a display from an apparatus for determining classroom engagement where academic engagement results for an educational course are displayed.

FIG. 8 is a screenshot 800 of a display from an apparatus 102, 200, 300 for determining classroom engagement where academic engagement results for an educational course are displayed. The screenshot 800 depicts further information provided about the MGMT 6800 course when a user clicks on the box with information about the course in the screen depicted in FIG. 700. Thus, a user is able to drill down to find additional information about a course. In other embodiments, the apparatuses 200, 300 may be used for multiple universities where average scores for the universities may be depicted in a graph. In other embodiments, the apparatuses 102, 200, 300 may be used to focus on a particular department, a particular college, etc. of a university. In other embodiments, the apparatuses 102, 200, 300 may be used for other educational organizations to gauge academic engagement. One of skill in the art will recognize other ways for a user to use the apparatuses 102, 200, 300 of FIGS. 1-3.

Figure 9:
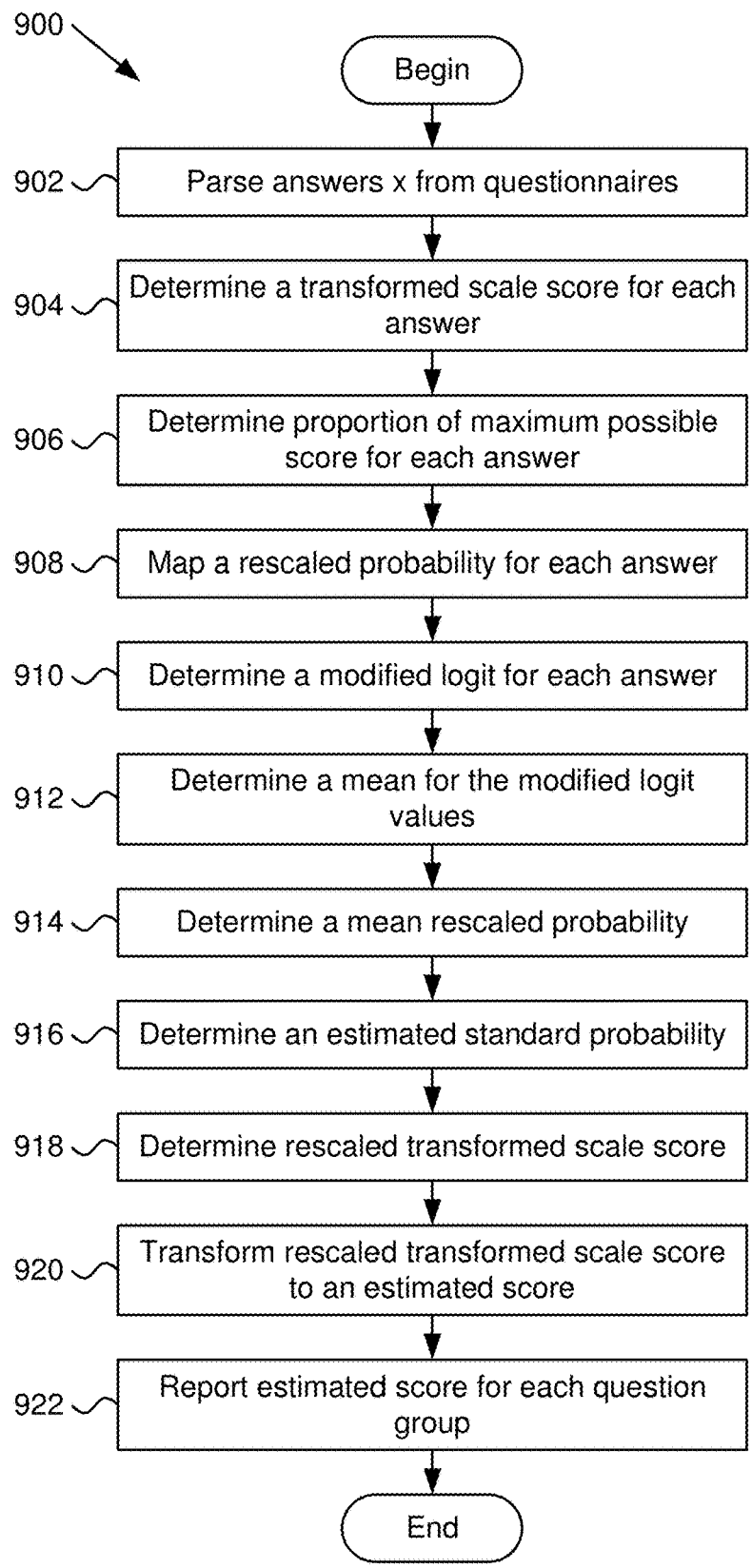
FIG. 9 is a schematic flowchart diagram illustrating one embodiment of a method for academic engagement.

FIG. 9 is a schematic flowchart diagram illustrating one embodiment of a method 900 for academic engagement. The method 900 begins and parses 902 answers x from a plurality of questions from a plurality of completed questionnaires. The answers are from one or more questions forming a question group and the plurality of questionnaires form a questionnaire group. Answers for each question include discrete numbers from 1 to n. The method 900 determines 904 a transformed scale score for each answer to questions in the questionnaire for the questionnaire group as: $\check{x}=x-1$ and determines 906 a POMP score p for each answer as:

$$p = \frac{\check{x}}{n}.$$

The method 900 maps 908 a rescaled probability $\acute{p}$ for each answer as: $\acute{p}=\delta p+0.5(1-\delta)$, where $\delta$ is a scaling constant greater than 0.5 and less than 1 and p is the POMP score and determines 910 a modified logit t of the rescaled probability $\acute{p}$ for each answer as:

$$t = \ln\left(\frac{\acute{p}}{1-\acute{p}}\right).$$

The method 900 determines 912 a mean for the modified logit values t for each question group for the questionnaire group from the modified logit t values. In other embodiments, the method 900 also determines 912 a standard deviation, a confidence interval and/or other statistics from the modified logit t values. The method 900 determines 914 a mean rescaled probability $\acute{p}$ for each determined mean for modified logit values $\acute{t}$ as:

$$\acute{p} = \frac{e^{\acute{t}}}{1+e^{\acute{t}}},$$

determines 916 an estimated standard probability $\hat{p}$ for the mean rescaled probability $\acute{p}$ as:

$$\hat{p} = \frac{\acute{p} + 0.5(\delta - 1)}{\delta}$$

and determines 918 a rescaled transformed scale score $\hat{x}$ for the estimated standard probability $\hat{p}$ as: $\hat{x}=4\hat{p}$. The method 900 transforms 920 the rescaled transformed scale score to an estimated $\hat{X}$ for each rescaled transformed scale score $\hat{x}$ as: $X=\hat{x}+1$ and reports 922 the estimated $\hat{X}$ for each question group of the questionnaire group, and the method 900 ends.

Steps of the methods 900, in various embodiments, may be implemented with one or more of the data parsing module 202, the range transformation module 204, the POMP module 206, the rescaled probability module 208, the modified logit module 210, the statistics module 212, the mean rescaled probability module 214, the estimated standard probability module 216, the rescaled value module 218, the range retransformation module 220, and the reporting module 222.

Figure 10:
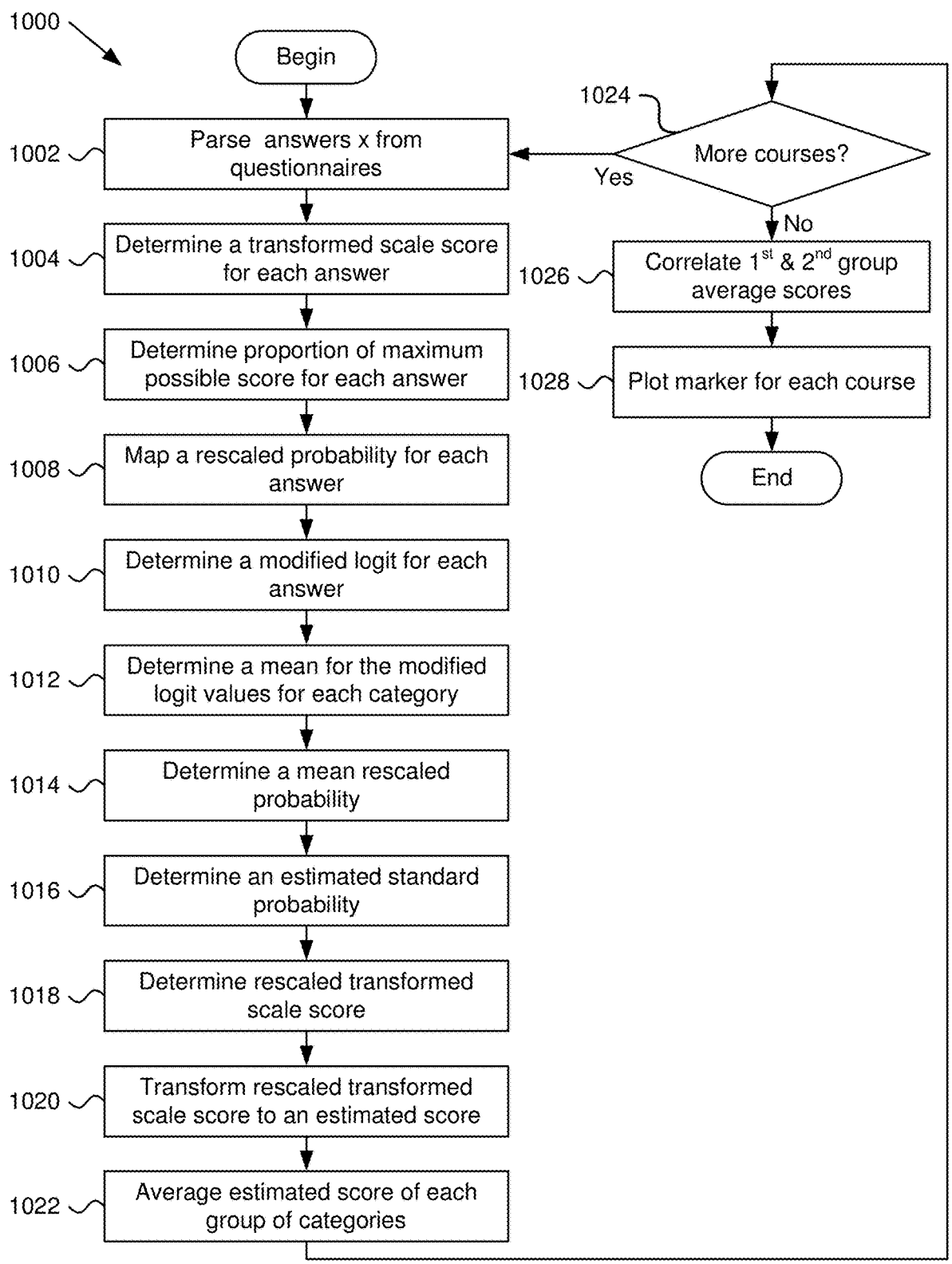
FIG. 10 is a schematic flowchart diagram illustrating another embodiment of a method for academic engagement.

FIG. 10 is a schematic flowchart diagram illustrating another embodiment of a method 10 for academic engagement. The method 1000 begins and parses 1002 answers x from a plurality of questions from a plurality of completed questionnaires. The answers are from one or more questions forming a question group and the plurality of questionnaires form a questionnaire group. Answers for each question include discrete numbers from 1 to n. The method 1000 determines 1004 a transformed scale score for each answer to questions in the questionnaire for the questionnaire group as: $\acute{x}=x-1$ and determines 1006 a POMP score p for each answer as:

$$p = \frac{\acute{x}}{n}.$$

The method 1000 maps 1008 a rescaled probability $\acute{p}$ for each answer as: $\acute{p}=\delta p+0.5(1-\delta)$, where $\delta$ is a scaling constant greater than 0.5 and less than 1 and p is the POMP score and determines 1010 a modified logit t of the rescaled probability $\acute{p}$ for each answer as:

$$t = \ln\left(\frac{\acute{p}}{1-\acute{p}}\right).$$

The method 1000 determines 1012 a mean for the modified logit values $\acute{t}$ for each question group for the questionnaire group from the modified logit t values. In other embodiments, the method 1000 also determines 1014 a standard deviation, a confidence interval and/or other statistics from the modified logit t values. The method 1000 determines 1014 a mean rescaled probability $\acute{p}$ for each determined mean for modified logit values $\acute{t}$ as:

$$\acute{p} = \frac{e^{\acute{t}}}{1+e^{\acute{t}}},$$

determines 1016 an estimated standard probability $\hat{p}$ for the mean rescaled probability $\acute{p}$ as:

$$\hat{p} = \frac{\acute{p} + 0.5(\delta - 1)}{\delta}$$

and determines 1018 a rescaled transformed scale score $\hat{x}$ for the estimated standard probability $\hat{p}$ as: $\hat{x}=4\hat{p}$. The method 1000 transforms 1020 the rescaled transformed scale score to an estimated $\hat{X}$ for each rescaled transformed scale score $\hat{x}$ as: $\hat{X}=\hat{x}+1$.

In some embodiments, the question group includes a group of questions from a same category of questions and the questionnaire includes m categories of questions and where a first portion of categories of the m categories includes a first category group and a second portion of categories of the m categories includes a second category group. The method 1000 averages 1022 the estimated scores $\hat{X}$ of categories of the first category group to determine a first group average score for each of the one or more educational courses and averages 1022 the estimated scores $\hat{X}$ of categories of the second category group to determine a second group average score for each of the one or more educational courses.

The method 1000 determines 1024 if there are answers for more courses to process. If the method 1000 determines 1024 that there are answers for more courses to process, the method 1000 returns and parses 1002 answers x from questionnaires. If the method 1000 determines 1024 that there are not answers for more courses to process, the method 1000 optionally correlates 1026 the first group average score and the second group average score and the method 1000 plots 1028 a marker for each educational course on a graph on an electronic display 110 where a first axis is first group average scores and a second axis is second group average scores, and the method 1000 ends.

Steps of the methods 1000, in various embodiments, may be implemented with one or more of the data parsing module 202, the range transformation module 204, the POMP module 206, the rescaled probability module 208, the modified logit module 210, the statistics module 212, the mean rescaled probability module 214, the estimated standard probability module 216, the rescaled value module 218, the range retransformation module 220, the reporting module 222, the category summation module 302, the multiple course module 304, the correlation module 306 and the plotting module 308.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a data parsing module that parses answers x from a plurality of questions from a plurality of completed questionnaires, the answers from one or more questions forming a question group, the plurality of completed questionnaires forming a questionnaire group, wherein answers for each question comprise discrete numbers from 1 to n;
    a range transform module that determines a transformed scale score for each answer x to questions in the plurality of completed questionnaires for the questionnaire group as: $\acute{x}=x-1$;
    a proportion of maximum possible ("POMP") module that determines a POMP score p for each answer as:

$$p = \frac{\acute{x}}{n};$$

a rescaled probability module that maps a rescaled probability $\hat{p}$ for each answer as: $\hat{p}=\delta p+0.5(1-\delta)$, where $\delta$ is a scaling constant greater than 0.5 and less than 1 and p is the POMP score;
    a modified logit module that determines a modified logit t of the rescaled probability $\hat{p}$ for each answer as:

$$t = \ln\left(\frac{\hat{p}}{1-\hat{p}}\right);$$

a statistics module that determines a mean for the modified logit values $\hat{t}$ for each question group for the questionnaire group from the modified logit t values;
    a mean rescaled probability module that determines a mean rescaled probability $\acute{p}$ for each determined mean for modified logit values $$\acute{p} = \frac{e^{\hat{t}}}{1+e^{\hat{t}}};$$

an estimated standard probability module that determines an estimated standard probability p for the mean rescaled probability $\acute{p}$ as:

$$\hat{p} = \frac{\acute{p}+0.5(\delta-1)}{\delta};$$

a rescaled value module that determines a rescaled transformed scale score $\acute{x}$ for the estimated standard probability $\hat{p}$ as: $\acute{x}=4\hat{p}$;
    a range retransformation module that transforms the rescaled transformed scale score $\acute{x}$ to an estimated score $\hat{X}$ for each rescaled transformed scale score $\acute{x}$ as: $\hat{X}=\acute{x}+1$; and
    a reporting module that generates and presents an interactive graphical display for reporting the estimated score $\hat{X}$ for each question group of the questionnaire group, the interactive graphical display providing interactive graphical elements for selecting different results related to the estimated score to present in the interactive graphical display, at least one of the interactive graphical elements comprising a plot graph that displays a plurality of markers depicting a relation between at least two different groups of estimated scores wherein each marker is interactive such that selection of a marker triggers graphical presentation of information associated with the selected marker,
    wherein the question group comprises a group of questions from a same category of questions and the plurality of completed questionnaires comprise m categories of questions, and further comprising a category summation module that averages the estimated score $\hat{X}$ of at least a portion of the m categories into an average score and reports the average score of the at least a portion of the m categories, wherein the reporting module reports the estimated score $\hat{X}$ of the category of questions,
    wherein said modules comprise one or more of hardware circuits, programmable hardware circuits, and executable code, the executable code stored on one or more computer readable storage media.

2. The apparatus of claim 1, wherein the questions from the plurality of completed questionnaires comprise questions for students taking an educational course.

3. The apparatus of claim 2, further comprising a multiple course module that uses the data parsing module, the range transform module, the POMP module, the rescaled probability module, the modified logit module, the statistics module, the mean rescaled probability module, the estimated standard probability module, the rescaled value module and the range retransformation module to determine an average score for at least a portion of the m categories for each of one or more educational courses and wherein the reporting module reports the average scores for each educational course.

4. The apparatus of claim 3, wherein a first portion of categories of the m categories comprise a first category group and a second portion of categories of the m categories comprise a second category group and the category summation module averages the estimated scores $\hat{X}$ of categories of the first category group to determine a first group average score for each of the one or more educational courses and averages the estimated scores $\hat{X}$ of categories of the second category group to determine a second group average score for each of the one or more educational courses and the reporting module reports the first group average score and the second group average score for each of the one or more educational courses.

5. The apparatus of claim 4, further comprising a correlation module that correlates the first group average score and the second group average score and the reporting module reports the correlation of the first group average score and the second group average score.

6. The apparatus of claim 4, wherein the reporting module further comprises a plotting module that plots a marker for each educational course on a graph on an electronic display where a first axis is first group average scores and a second axis is second group average scores.

7. The apparatus of claim 2, wherein the questions from the plurality of completed questionnaires comprise assessing engagement of students taking the educational course and the m categories comprise categories linked to assessment of academic engagement and community engagement of the students.

8. The apparatus of claim 7, wherein the categories comprise content, context, tools, collaboration, theory and knowledge, application and skills, community involvement and expert interaction.

9. The apparatus of claim 8, wherein the categories of content, context, tools, collaboration, theory and knowledge, and application and skills comprise a curriculum engagement group and the categories of community involvement and expert interaction comprise a community engagement group and the category summation module averages the estimated score $\check{X}$ of the curriculum engagement group into a curriculum engagement average score and averages the estimated score g of the community engagement group into a community engagement average score and the reporting module reports the curriculum average score and the community engagement average score.

10. The apparatus of claim 9, further comprising a multiple course module that uses the data parsing module, the range transform module, the POMP module, the rescaled probability module, the modified logit module, the statistics module, the mean rescaled probability module, the estimated standard probability module, the rescaled value module and the range retransformation module to determine an average score for the curriculum engagement group and for the community engagement group for each of one or more educational courses and wherein the reporting module reports the curriculum engagement average scores and the community engagement scores for each educational course.

11. The apparatus of claim 10, further comprising a correlation module that correlates the curriculum engagement average score and the community engagement average score for one or more of the educational courses and the reporting module reports the correlation of the curriculum engagement average score and the community engagement average score for the one or more educational courses.

12. The apparatus of claim 10, wherein the reporting module further comprises a plotting module that plots a marker for each educational course on a graph on an electronic display where a first axis is curriculum engagement average scores and a second axis is community engagement average scores.

13. An apparatus comprising:
a data parsing module that parses answers x from a plurality of questions from a plurality of completed questionnaires, the plurality of completed questionnaires forming a questionnaire group, wherein answers for each question comprise discrete numbers from 1 to n, wherein the questions from the plurality of completed questionnaires comprise questions for assessing engagement of students taking an educational course, wherein the questions are grouped into questions from a same category, the categories comprising content, context, tools, collaboration, theory and knowledge, and application and skills in a curriculum engagement group, and community involvement and expert interaction in a community engagement group;

a range transform module that determines a transformed scale score $\hat{x}$ for each answer to questions in the plurality of completed questionnaires for the questionnaire group as: $\hat{x}=x-1$;

a proportion of maximum possible ("POMP") module that determines a POMP score p for each answer as:

$$p = \frac{\hat{x}}{n};$$

a rescaled probability module that maps a rescaled probability $\hat{p}$ for each answer as: $\hat{p}=\delta p+0.5(1-\delta)$, where $\delta$ is a scaling constant greater than 0.5 and less than 1 and p is the POMP score;

a modified logit module that determines a modified logit t of the rescaled probability $\hat{p}$ for each answer as:

$$t = \ln\left(\frac{\hat{p}}{1-\hat{p}}\right);$$

a statistics module that determines a mean for the modified logit values $\hat{t}$ for each category of questions from the calculated t values;

a mean rescaled probability module that determines a mean rescaled probability $\acute{p}$ for each modified logit value t as:

$$\acute{p} = \frac{e^t}{1+e^t};$$

an estimated standard probability module that determines an estimated standard probability $\dot{p}$ for each mean rescaled probability $\acute{p}$ as:

$$\dot{p} = \frac{\acute{p}+0.5(\delta-1)}{\delta};$$

a rescaled value module that determines a rescaled transformed scale score $\acute{x}$ for each estimated standard probability $\dot{p}$ as: $\acute{x}=4\dot{p}$;

a range retransformation module that transforms the rescaled transformed scale score $\acute{x}$ to an estimated score $\acute{X}$ for each rescaled transformed scale score $\acute{x}$ as: $\acute{X}=\acute{x}+1$;

a category summation module that averages the estimated score $\check{X}$ for the curriculum engagement group into a curriculum engagement average score and that averages the estimated score g for the community engagement group into a community engagement average score;

a reporting module that generates and presents an interactive graphical display for reporting the curriculum engagement average score for the questionnaire group and reports the community engagement average score for the questionnaire group, the interactive graphical display providing interactive graphical elements for selecting different results related to the average scores to present in the interactive graphical display, at least one of the interactive graphical elements comprising a plot graph that displays a plurality of markers depicting a relation between at least two different groups of average scores wherein each marker is interactive such that selection of a marker triggers graphical presentation of information associated with the selected marker,
wherein said modules comprise one or more of hardware circuits, programmable hardware circuits and executable code, the executable code stored on one or more computer readable storage media.

14. The apparatus of claim 13, wherein the questionnaire group comprises questionnaires for an educational course and further comprising a multiple course module that uses the data parsing module, the range transform module, the POMP module, the rescaled probability module, the modified logit module, the statistics module, the mean rescaled probability module, the estimated standard probability module, the rescaled value module, the range retransformation module and the category summation module to determine a curriculum engagement average score and a community engagement average score for each of one or more educational courses and wherein the reporting module reports the curriculum engagement average scores and the community engagement scores for each educational course.

15. The apparatus of claim 14, wherein the reporting module further comprises a plotting module that plots a marker for each educational course on a graph on an electronic display where a first axis is curriculum engagement average scores and a second axis is community engagement average scores.

16. A method comprising:
parsing, by a processor, answers x from a plurality of questions from a plurality of completed questionnaires, the answers from one or more questions forming a question group, the plurality of completed questionnaires forming a questionnaire group, wherein answers for each question comprise discrete numbers from 1 to n;
determining, by the processor, a transformed scale score for each answer to questions in the plurality of completed questionnaires for the questionnaire group as: $\acute{x}=x-1$;
determining, by the processor, a proportion of maximum possible ("POMP") score p for each answer as:

$$p = \frac{\acute{x}}{n};$$

mapping, by the processor, a rescaled probability $\hat{p}$ for each answer as: $\hat{p}=\delta p+0.5(1-\delta)$, where $\delta$ is a scaling constant greater than 0.5 and less than 1 and p is the POMP score;
determining, by the processor, a modified logit t of the rescaled probability $\hat{p}$ for each answer as:

$$t = \ln\left(\frac{\hat{p}}{1-\hat{p}}\right);$$

determining, by the processor, a mean for the modified logit values $\hat{t}$ for each question group for the questionnaire group from the modified logit t values;
determining, by the processor, a mean rescaled probability $\hat{p}$ for each determined mean for modified logit values $\hat{t}$ as:

$$\hat{p} = \frac{e^{\hat{t}}}{1+e^{\hat{t}}};$$

determining, by the processor, an estimated standard probability $\acute{p}$ for the mean rescaled probability $\hat{p}$ as:

$$\acute{p} = \frac{\hat{p}+0.5(\delta-1)}{\delta};$$

determining, by the processor, a rescaled transformed scale score $\acute{x}$ for the estimated standard probability $\acute{p}$ as: $\acute{x}=4\acute{p}$;
transforming, by the processor, the rescaled transformed scale score to an estimated score $\acute{X}$ for each rescaled transformed scale score $\acute{x}$ as: $\acute{X}=\acute{x}+1$; and
generating and presenting, by the processor, an interactive graphical display for reporting the estimated score $\acute{X}$ for each question group of the questionnaire group, the interactive graphical display providing interactive graphical elements for selecting different results related to the estimated score to present in the interactive graphical display, at least one of the interactive graphical elements comprising a plot graph that displays a plurality of markers depicting a relation between at least two different groups of estimated scores wherein each marker is interactive such that selection of a marker triggers graphical presentation of information associated with the selected marker,
wherein the question group comprises a group of questions from a same category of questions and the plurality of completed questionnaires comprise m categories of questions, and averaging the estimated score g of at least a portion of the m categories into an average score and reports the average score of the at least a portion of the m categories, and further comprising reporting the estimated score g of the category of questions.

17. The method of claim 16, wherein a first portion of categories of the m categories comprise a first category group and a second portion of categories of the m categories comprise a second category group and further comprising:
averaging the estimated scores $\acute{X}$ of categories of the first category group to determine a first group average score for each of the one or more educational courses and averaging the estimated scores $\acute{X}$ of categories of the second category group to determine a second group average score for each of the one or more educational courses; and
plotting a marker for each educational course on a graph on an electronic display where a first axis is first group average scores and a second axis is second group average scores.

18. The method of claim 16, wherein the questions from the plurality of completed questionnaires comprise questions for students taking an educational course.

19. The method of claim 17, wherein:
further comprising correlating the first group average score and the second group average score and reporting the correlation of the first group average score and the second group average score.

20. The method of claim 16, wherein the questions from the plurality of completed questionnaires comprise assessing engagement of students taking an educational course and the m categories comprise categories linked to assessment of academic engagement and community engagement of the students.

21. The method of claim 20, wherein the categories comprise content, context, tools, collaboration, theory and knowledge, application and skills, community involvement and expert interaction.

22. The method of claim 21, wherein the categories of content, context, tools, collaboration, theory and knowledge, and application and skills comprise a curriculum engagement group and the categories of community involvement and expert interaction comprise a community engagement group and further comprising averaging the estimated score $\bar{X}$ of the curriculum engagement group into a curriculum engagement average score and averages the estimated score $\bar{X}$ of the community engagement group into a community engagement average score and further comprising reporting the curriculum average score and the community engagement average score.

23. The method of claim 22, further comprising determining an average score for the curriculum engagement group and for the community engagement group for each of one or more educational courses and further comprising reporting the curriculum engagement average scores and the community engagement scores for each educational course.

24. The method of claim 23, further comprising correlating the curriculum engagement average score and the community engagement average score for one or more of the educational courses and further comprising reporting the correlation of the curriculum engagement average score and the community engagement average score for the one or more educational courses.

25. The method of claim 23, further comprising plotting a marker for each educational course on a graph on an electronic display where a first axis is curriculum engagement average scores and a second axis is community engagement average scores.

* * * * *